: US 10,345,607 B2
(45) Date of Patent: Jul. 9, 2019

(12) United States Patent
Wang et al.

(54) DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Jifeng Tan, Beijing (CN); Xinli Ma, Beijing (CN); Can Zhang, Beijing (CN); Can Wang, Beijing (CN); Jian Gao, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/749,494
(22) PCT Filed: Jun. 7, 2017
(86) PCT No.: PCT/CN2017/087432
§ 371 (c)(1),
(2) Date: Jan. 31, 2018
(87) PCT Pub. No.: WO2017/219865
PCT Pub. Date: Dec. 28, 2017

(65) Prior Publication Data
US 2018/0217389 A1 Aug. 2, 2018

(30) Foreign Application Priority Data
Jun. 24, 2016 (CN) .......................... 2016 1 0474993

(51) Int. Cl.
*G02B 27/22* (2018.01)
*G02B 5/20* (2006.01)
*G02B 5/18* (2006.01)

(52) U.S. Cl.
CPC ........... *G02B 27/22* (2013.01); *G02B 5/1819* (2013.01); *G02B 5/201* (2013.01); *H04N 2213/001* (2013.01)

(58) Field of Classification Search
CPC ...... G02B 27/22; G02B 5/201; G02B 5/1819; H04N 2213/001
(Continued)

(56) References Cited

U.S. PATENT DOCUMENTS

2001/0001566 A1 5/2001 Moseley et al.
2010/0156773 A1 6/2010 Uehara et al.
(Continued)

FOREIGN PATENT DOCUMENTS

CN 101655608 A 2/2010
CN 102413352 A 4/2012
(Continued)

OTHER PUBLICATIONS

Office Action received for Chinese Patent Application No. 201610474993.5, dated Nov. 8, 2017, 10 pages (5 pages of English Translation and 5 pages of Office Action).
(Continued)

*Primary Examiner* — Stephone B Allen
*Assistant Examiner* — Rahman Abdur
(74) *Attorney, Agent, or Firm* — Womble Bond Dickinson (US) LLP

(57) ABSTRACT

The present disclosure provides a display device. The display device comprises a display panel and a grating layer, wherein along a direction pointing from a center of a left-eye field-of-view central area to a non left-eye field-of-view central area, a grating period of a left-eye grating region of a first color, a grating period of a left-eye grating region of a second color, and a grating period of a left-eye grating region of a third color all decrease gradually; along a direction pointing from a center of a right-eye field-of-view central area to a non right-eye field-of-view central area, a grating period of a right-eye grating region of the first color, a grating period of a right-eye grating region of the second color, and a grating period of a right-eye grating region of the third color all decrease gradually.

20 Claims, 8 Drawing Sheets

(58) Field of Classification Search
USPC .......................................................... 359/462
See application file for complete search history.

(56) References Cited

U.S. PATENT DOCUMENTS

| | | |
|---|---|---|
| 2013/0100365 A1 | 4/2013 | Komura et al. |
| 2014/0300709 A1 | 10/2014 | Futterer et al. |
| 2015/0309319 A1 | 10/2015 | Wei |
| 2016/0033778 A1 | 2/2016 | Lin et al. |

FOREIGN PATENT DOCUMENTS

| | | |
|---|---|---|
| CN | 103246069 A | 8/2013 |
| CN | 103499898 A | 1/2014 |
| CN | 103792607 A | 5/2014 |
| CN | 104460018 A | 3/2015 |
| CN | 105093546 A | 11/2015 |
| CN | 105892079 A | 8/2016 |
| CN | 105911710 A | 8/2016 |
| CN | 105911711 A | 8/2016 |
| CN | 105929587 A | 9/2016 |
| CN | 205720988 U | 11/2016 |
| JP | 2013-092607 A | 5/2013 |
| JP | 2016-048344 A | 4/2016 |

OTHER PUBLICATIONS

International Search Report received for PCT Patent Application No. PCT/CN2017/087432, dated Aug. 30, 2017, 8 pages (3 pages of English Translation and 5 pages of Original Document).

DISPLAY DEVICE

RELATED APPLICATION

This application claims priority to the Chinese patent application No. 201610474993.5 filed on Jun. 24, 2016, the entirety of which is incorporated herein by reference.

FIELD

The present disclosure relates to the field of display technology, in particular to a display device.

BACKGROUND

A display device is a device for displaying characters, numbers, symbols, pictures or images formed by at least two selected from a group comprising characters, numbers, symbols and pictures. The display device can be a flat surface display device, a curved-surface display device, a 3D display device, a near eye display device, or an enhanced reality (AR)/virtual reality (VR) display device, etc.

With the development of display devices, more and more sophisticated demands are brought out by people with the on-the-spot effect of display and the immersion of viewers. In order to improve the on-the-spot effect of display and the immersion of the viewer, one of the key technologies is to effectively control light propagation within the display device. For example, with respect to a display device for 3D display, the display device has a fixed left-eye field-of-view central area and right-eye field-of-view central area, wherein the left-eye field-of-view central area and a non left-eye field-of-view central area together form a light exiting surface of the whole display device, and the right-eye field-of-view central area and a non right-eye field-of-view central area also together form a light exiting surface of the whole display device. When a viewer is in a viewing area in front of the display device and is viewing an image displayed by the display device, a left-eye sight of the viewer concentrates on the left-eye field-of-view central area, and a right-eye sight of the viewer concentrates on the right-eye field-of-view central area. By controlling light propagation within the display device, the image viewed by the viewer seem to be projected on a virtual screen in front of or behind the display device, and the viewer is enabled to see the image displayed by the whole display device, thus realizing virtual display of the display device, which makes the display device to have a good on-the-spot effect and can improve the immersion of the viewer.

At present, microprisms or microlenses are usually provided in the display device to control light propagation within the display device. That is, the existing display device usually uses structures designed on the basis of geometrical optics principles to realize control to light propagation within the display device. However, with the development of 3D display devices, structures designed on the basis of geometrical optics principles can no longer meet the requirements on the control to light propagation within the display device, so the on-the-spot effect of the display device and the immersion of the viewers get worse, and bad viewing experience is brought to the viewers.

SUMMARY

An object of at least some embodiments of the present disclosure is to at least provide an improved display device.

In order to achieve the above object, an embodiment of the present disclosure provides a display device, comprising: a display panel, and a grating layer arranged inside or outside of the display panel. The display panel comprises a plurality of left-eye pixels of a first color, a plurality of left-eye pixels of a second color, a plurality of left-eye pixels of a third color, a plurality of right-eye pixels of the first color, a plurality of right-eye pixels of the second color, and a plurality of right-eye pixels of the third color.

Correspondingly, the grating layer comprises a grating region of the first color, a grating region of the second color and a grating region of the third color. The grating region of the first color comprises: a left-eye grating region of the first color corresponding to the left-eye pixels of the first color, and a right-eye grating region of the first color corresponding to the right-eye pixels of the first color. The grating region of the second color comprises: a left-eye grating region of the second color corresponding to the left-eye pixels of the second color, and a right-eye grating region of the second color corresponding to the right-eye pixels of the second color. The grating region of the third color comprises: a left-eye grating region of the third color corresponding to the left-eye pixels of the third color, and a right-eye grating region of the third color corresponding to the right-eye pixels of the third color.

Along a direction pointing from a center of a left-eye field-of-view central area of the display device to a non left-eye field-of-view central area of the display device, a grating period of the left-eye grating region of the first color, a grating period of the left-eye grating region of the second color, and a grating period of the left-eye grating region of the third color all decrease gradually. Light emitted by the display device from positions corresponding to the left-eye pixels of the first color, light emitted by the display device from positions corresponding to the left-eye pixels of the second color, and light emitted by the display device from positions corresponding to the left-eye pixels of the third color are all directed at a left eye of a viewer.

Along a direction pointing from a center of a right-eye field-of-view central area of the display device to a non right-eye field-of-view central area of the display device, a grating period of the right-eye grating region of the first color, a grating period of the right-eye grating region of the second color, and a grating period of the right-eye grating region of the third color all decrease gradually. Light emitted by the display device from positions corresponding to the right-eye pixels of the first color, light emitted by the display device from positions corresponding to the right-eye pixels of the second color, and light emitted by the display device from positions corresponding to the right-eye pixels of the third color are all directed at a right eye of the viewer.

A grating layer is arranged in the display device provided in the embodiment of the present disclosure. By setting the grating periods at individual positions of the grating layer, a diffraction effect of light during propagation in the display device can be controlled, thereby controlling light propagation within the display device and realizing control to light emitted by the display device. In other words, in the embodiment of the present disclosure, a structure designed on the basis of physical optics principles is used to control light propagation within the display device. Compared to the structure designed on the basis of the geometrical optics principles for controlling light propagation within the display device in the prior art, the structure designed on the basis of the physical optics principles has higher ability in controlling light propagation within the display device, so it can better control light propagation within the display device, improve the effect of controlling of light propagation within the display device, and improve the on-the-spot effect of display of the display device, the immersion of viewers and viewing experiences of viewers. As a result, the viewers can enjoy more real and comfortable viewing experience.

BRIEF DESCRIPTION OF THE DRAWINGS

Figures illustrated herein are to provide further understanding of the present disclosure and form a part of the present disclosure. Exemplary embodiments of the present disclosure and descriptions thereof are used to explain the present disclosure, but not intended to inappropriately define the present disclosure. In the figures.

DETAILED DESCRIPTION

In order to further illustrate the display device provided in embodiments of the present disclosure, detailed descriptions are given below with reference to the figures of the description.

Figure 1:
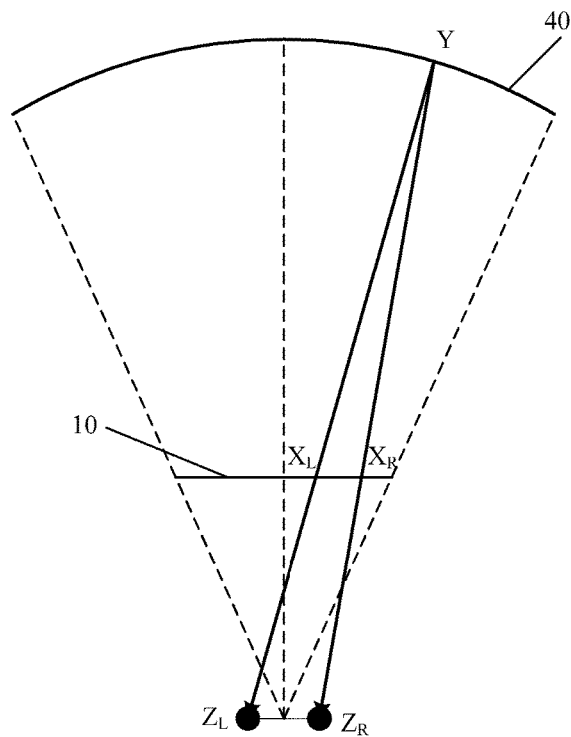
FIG. 1 schematically shows a positional relationship between a display device and a viewer.
Figure 2:
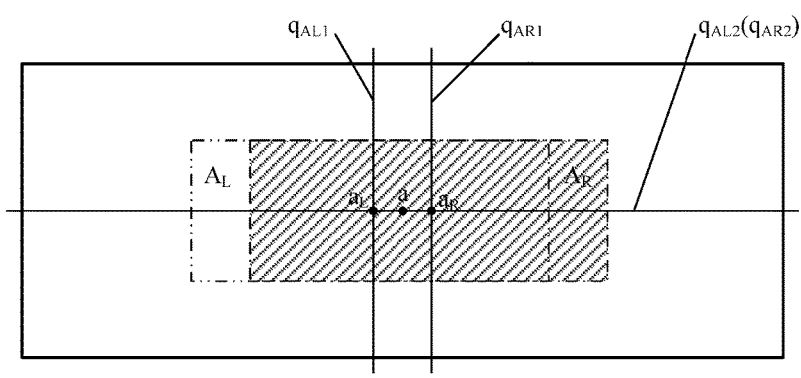
FIG. 2 is a plane view of the display device as shown in FIG. 1.
Figure 3:
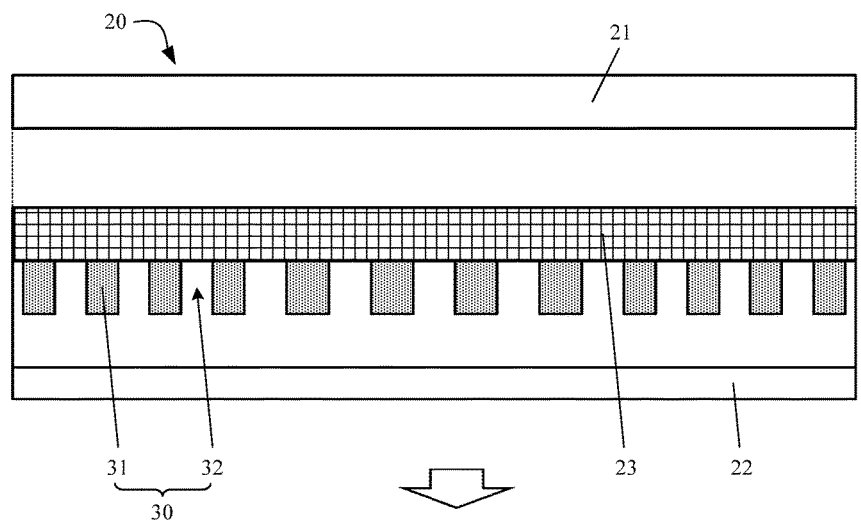
FIG. 3 is a sectional view of a display device provided in an embodiment of the present disclosure.

In the figures, the following reference signs are used:
10—display device
20—display panel
21—first substrate
22—second substrate
23—color film layer
30—grating layer
31—grating bulge
32—gap
40—virtual screen
50—back light source Referring to FIGS. 1-3, a display device 10 provided in an embodiment of the present disclosure comprises a display panel 20, and a grating layer 30 arranged inside or outside of the display panel 20. The display panel 20 comprises a plurality of left-eye R pixels, a plurality of left-eye G pixels, a plurality of left-eye B pixels, a plurality of right-eye R pixels, a plurality of right-eye G pixels, and a plurality of right-eye B pixels. Correspondingly, the grating layer 30 comprises an R grating region, a G grating region and a B grating region. The R grating region comprises: a left-eye R grating region corresponding to the left-eye R pixels, and a right-eye R grating region corresponding to the right-eye R pixels. The G grating region comprises: a left-eye G grating region corresponding to the left-eye G pixels, and a right-eye G grating region corresponding to the right-eye G pixels. The B grating region comprises: a left-eye B grating region corresponding to the left-eye B pixels, and a right-eye B grating region corresponding to the right-eye B pixels.

Along a direction pointing from a center $a_L$ of a left-eye field-of-view central area $A_L$ of the display device 10 to a non left-eye field-of-view central area of the display device 10, a grating period of the left-eye R grating region, a grating period of the left-eye G grating region, and a grating period of the left-eye B grating region all decrease gradually. Light emitted by the display device 10 from positions corresponding to the left-eye R pixels, light emitted by the display device 10 from positions corresponding to the left-eye G pixels, and light emitted by the display device 10 from positions corresponding to the left-eye B pixels are all directed at a left eye $Z_L$ of a viewer.

Along a direction pointing from a center $a_R$ of a right-eye field-of-view central area $A_R$ of the display device 10 to a non right-eye field-of-view central area of the display device 10, a grating period of the right-eye R grating region, a grating period of the right-eye G grating region, and a grating period of the right-eye B grating region all decrease gradually. Light emitted by the display device 10 from positions corresponding to the right-eye R pixels, light emitted by the display device 10 from positions corresponding to the right-eye G pixels, and light emitted by the display device 10 from positions corresponding to the right-eye B pixels are all directed at a right eye $Z_R$ of the viewer.

It shall be noted that in the above embodiment, the display device 10 can be a flat surface display device or a curved surface display device. In the embodiment of the present disclosure, detailed descriptions are given for an example that the display device 10 is a flat surface display device.

For example, referring to FIGS. 1 and 2, the display device 10 provided in the embodiment of the present disclosure has a left-eye field-of-view central area $A_L$ and a non left-eye field-of-view central area. The display device 10 also has a right-eye field-of-view central area $A_R$ and a non right-eye field-of-view central area. The left-eye field-of-view central area $A_L$ and the non left-eye field-of-view central area together form a light exiting surface of the whole display device 10, and the right-eye field-of-view central area $A_R$ and the non right-eye field-of-view central area also together form a light exiting surface of the whole display device 10. There is a viewing area in front of the display device 10. When a viewer is in the viewing area and is viewing an image displayed by the display device 10, a sight of the left eye $Z_L$ of the viewer concentrates on the left-eye field-of-view central area $A_L$, and a sight of the right eye $Z_R$ of the viewer concentrates on the right-eye field-of-view central area $A_R$.

When the viewer is in the viewing area in front of the display device 10 and is viewing an image displayed by the display device 10, the image viewed by the viewer seem to be projected on a virtual screen 40 behind or in front of the display device 10. In this case, the viewer, display device 10 and virtual screen 40 form an optical system, in which the virtual screen 40 can be at a focal plane of the optical system. For example, the virtual screen 40 can be at a back focal plane of the optical system, i.e. the virtual screen 40 is at a focal plane behind the display device 10. Alternatively, the virtual screen 40 can be at a front focal plane of the optical system, i.e. the virtual screen 40 is at a focal plane in front of the display device 10. Suppose that there is a point Y on the virtual screen 40, and an image at the point Y as seen by the left eye $Z_L$ of the viewer is an image displayed at a point $X_L$ on the display device 10, and the left eye $Z_L$ of the viewer, the point Y on the virtual screen 40 and the point $X_L$ on the display device 10 are on a same straight line. Further, an image at point Y as seen by the right eye $Z_R$ of the viewer is an image displayed at a point $X_R$ on the display device 10, and the right eye $Z_R$ of the viewer, the point Y on the virtual screen 40 and the point $X_R$ on the display device 10 are on a same straight line. In this case, a distance of $X_L Y$ is a defocusing amount corresponding to the left eye $Z_L$ of the viewer in the optical system, and a distance of $X_R Y$ is a defocusing amount corresponding to the right eye $Z_R$ of the viewer in the optical system. Images displayed at individual positions of the display device 10 can be obtained by calculating from corresponding defocusing amounts. Alternatively, images displayed at individual positions of the display device 10 can be obtained by recording and storing by a special device.

In practical application, when the viewer is in the viewing area in front of the display device 10 and is viewing an image displayed by the display device 10, the image viewed by the viewer may further include a depth of field image. The depth of field image can be an image recorded and processed by a special device, or it can be an image obtained by calculation with a display chip or a Central Processing Unit (CPU) in the display device 10 according to an image processing algorithm. Therefore, the image displayed by the display device 10 can be one of: including only an image that can be projected on a certain virtual screen 40 in front of the display device 10; including only an image that can be projected on a certain virtual screen 40 behind the display device 10; including an image that can be projected on a certain virtual screen 40 in front of the display device 10 and a depth of field image of the virtual screen 40; including an image that can be projected on a certain virtual screen 40 behind the display device 10 and a depth of field image of the virtual screen 40; including an image that can be projected on a certain virtual screen 40 in front of the display device 10 and a depth of field image of the display device 10; including an image that can be projected on a certain virtual screen 40 behind the display device 10 and a depth of field image of the display device 10; including an image that can be projected on all virtual screens 40 viewable by the viewer and depth of field images of the individual virtual screens 40.

Referring to FIG. 3, the display device 10 comprises a display panel 20 and a grating layer 30. The display panel 20 can be a liquid crystal display panel or an OLED (Organic Light-Emitting Diode) display panel, a PDP (Plasma Display Panel), a CRT (Cathode Ray Tube) display panel, etc. The grating layer 30 is arranged inside or outside of the display panel 20. For example, when the display device 10 is a liquid crystal display device, the display device 10 comprises a back light source and a display panel 20 on a light exiting side of the back light source. The display panel 20 comprises a first substrate 21 and a second substrate 22 arranged opposite to each other, and the grating layer 30 can be arranged between the first substrate 21 and the second substrate 22. Alternatively, the grating layer 30 can be arranged on a side of the first substrate 21 facing away from the second substrate 22, or, the grating layer 30 can be arranged on a side of the second substrate 22 facing away from the first substrate 21, or the grating layer 30 can be arranged on the light exiting side of the back light source.

A color scheme of the display device 10 in the above embodiment is an RGB (Red, Green, Blue) color scheme. The display panel 20 comprises a plurality of left-eye R pixels, a plurality of left-eye G pixels, a plurality of left-eye B pixels, a plurality of right-eye R pixels, a plurality of right-eye G pixels, and a plurality of right-eye B pixels. Correspondingly, the grating layer 30 comprises an R grating region, a G grating region and a B grating region. The R grating region comprises: a left-eye R grating region corresponding to the left-eye R pixels, and a right-eye R grating region corresponding to the right-eye R pixels. The G grating region comprises: a left-eye G grating region corresponding to the left-eye G pixels, and a right-eye G grating region corresponding to the right-eye G pixels. The B grating region comprises: a left-eye B grating region corresponding to the left-eye B pixels, and a right-eye B grating region corresponding to the right-eye B pixels.

Along a direction pointing from a center $a_L$ of a left-eye field-of-view central area $A_L$ to a non left-eye field-of-view central area, a grating period of the left-eye R grating region, a grating period of the left-eye G grating region, and a grating period of the left-eye B grating region all decrease gradually. Namely, it can be considered that from the center $a_L$ of the left-eye field-of-view central area $A_L$ to individual edges of the display device 10, the grating period of the left-eye R grating region, the grating period of the left-eye G grating region, and the grating period of the left-eye B grating region all decrease gradually. As shown in FIG. 2, from the center $a_L$ of the left-eye field-of-view central area $A_L$ to an upper edge of the display device 10 as shown in FIG. 2, the grating period of the left-eye R grating region, the grating period of the left-eye G grating region, and the grating period of the left-eye B grating region all decrease gradually; from the center $a_L$ of the left-eye field-of-view central area $A_L$ to a lower edge of the display device 10 as shown in FIG. 2, the grating period of the left-eye R grating region, the grating period of the left-eye G grating region, and the grating period of the left-eye B grating region all decrease gradually; from the center $a_L$ of the left-eye field-of-view central area $A_L$ to a left edge of the display device 10 as shown in FIG. 2, the grating period of the left-eye R grating region, the grating period of the left-eye G grating region, and the grating period of the left-eye B grating region all decrease gradually; and from the center $a_L$ of the left-eye field-of-view central area $A_L$ to a right edge of the display device 10 as shown in FIG. 2, the grating period of the left-eye R grating region, the grating period of the left-eye G grating region, and the grating period of the left-eye B grating region all decrease gradually.

Light emitted by the display device 10 from positions corresponding to the left-eye R pixels, light emitted by the display device 10 from positions corresponding to the left-eye G pixels, and light emitted by the display device 10 from positions corresponding to the left-eye B pixels are all directed at the left eye $Z_L$ of the viewer. For example, as shown in FIG. 1, suppose that there is a point Y on the virtual screen 40, and an image at point Y as seen by the left eye $Z_L$ of the viewer is an image displayed at a point $X_L$ on the display device 10, and the left eye $Z_L$ of the viewer, the point Y on the virtual screen 40 and the point $X_L$ on the display device 10 are on a same straight line. Light emitted from the point $X_L$ on the display device 10 is directed at the left eye $Z_L$ of the viewer, i.e. light emitted from the point $X_L$ on the display device 10 is emitted along the straight line in which the left eye $Z_L$ of the viewer, the point Y on the virtual screen 40 and the point $X_L$ on the display device 10 are located. When the point $X_L$ on the display device 10 corresponds to a left-eye R pixel, it emits red light, and the red light is emitted along the straight line in which the left eye $Z_L$ of the viewer, the point Y on the virtual screen 40 and the point $X_L$ on the display device 10 are located; when the point $X_L$ on the display device 10 corresponds to a left-eye G pixel, it emits green light, and the green light is emitted along the straight line in which the left eye $Z_L$ of the viewer, the point Y on the virtual screen 40 and the point $X_L$ on the display device 10 are located; when the point $X_L$ on the display device 10 corresponds to a left-eye B pixel, it emits blue light, and the blue light is emitted along the straight line in which the left eye $Z_L$ of the viewer, the point Y on the virtual screen 40 and the point $X_L$ on the display device 10 are located.

Along a direction pointing from a center $a_R$ of a right-eye field-of-view central area $A_R$ to a non right-eye field-of-view central area, a grating period of the right-eye R grating region, a grating period of the right-eye G grating region, and a grating period of the right-eye B grating region all decrease gradually. Namely, it can be considered that from the center $a_R$ of the right-eye field-of-view central area $A_R$ to individual edges of the display device 10, the grating period of the right-eye R grating region, the grating period of the right-eye G grating region, and the grating period of the right-eye B grating region all decrease gradually. As shown in FIG. 2, from the center $a_R$ of the right-eye field-of-view central area $A_R$ to an upper edge of the display device 10 as shown in FIG. 2, the grating period of the right-eye R grating region, the grating period of the right-eye G grating region, and the grating period of the right-eye B grating region all decrease gradually; from the center $a_R$ of the right-eye field-of-view central area $A_R$ to a lower edge of the display device 10 as shown in FIG. 2, the grating period of the right-eye R grating region, the grating period of the right-eye G grating region, and the grating period of the right-eye B grating region all decrease gradually; from the center $a_R$ of the right-eye field-of-view central area $A_R$ to a left edge of the display device 10 as shown in FIG. 2, the grating period of the right-eye R grating region, the grating period of the right-eye G grating region, and the grating period of the right-eye B grating region all decrease gradually; and from the center $a_R$ of the right-eye field-of-view central area $A_R$ to a right edge of the display device 10 as shown in FIG. 2, the grating period of the right-eye R grating region, the grating period of the right-eye G grating region, and the grating period of the right-eye B grating region all decrease gradually.

Light emitted by the display device 10 from a position corresponding to a right-eye R pixel, light emitted by the display device 10 from a position corresponding to a right-eye G pixel, and light emitted by the display device 10 from a position corresponding to a right-eye B pixel are all directed at the right eye $Z_R$ of the viewer. For example, as shown in FIG. 1, suppose that there is a point Y on the virtual screen 40, and an image at the point Y as seen by the right eye $Z_R$ of the viewer is an image displayed at a point $X_R$ on the display device 10, and the right eye $Z_R$ of the viewer, the point Y on the virtual screen 40 and the point $X_R$ on the display device 10 are on a same straight line. Light emitted from the point $X_L$ on the display device 10 is directed at the right eye $Z_R$ of the viewer, i.e. light emitted from the point $X_R$ on the display device 10 is emitted along the straight line in which the right eye $Z_R$ of the viewer, the point Y on the virtual screen 40 and the point $X_R$ on the display device 10 are located. When the point $X_R$ on the display device 10 corresponds to a right-eye R pixel, it emits red light, and the red light is emitted along the straight line in which the right eye $Z_R$ of the viewer, the point Y on the virtual screen 40 and the point $X_R$ on the display device 10 are located; when the point $X_R$ on the display device 10 corresponds to a right-eye G pixel, it emits green light, and the green light is emitted along the straight line in which the right eye $Z_R$ of the viewer, the point Y on the virtual screen 40 and the point $X_R$ on the display device 10 are located; when the point $X_R$ on the display device 10 corresponds to a right-eye B pixel, it emits blue light, and the blue light is emitted along the straight line in which the right eye $Z_R$ of the viewer, the point Y on the virtual screen 40 and the point $X_R$ on the display device 10 are located.

A grating layer 30 is arranged in the display device 10 provided in the embodiment of the present disclosure. Incident light incident on the grating layer 30 is diffracted at the grating layer 30 and a kth-order diffraction (k=0, ±1, ±2K) is obtained. A relationship between a diffraction angle θ of the kth-order diffraction and a grating period P of the grating layer usually satisfies the formula of:

$$\sin\theta = \sin\theta_0 + \frac{k\lambda}{P}, k = 0, \pm 1, \pm 2K \quad (1)$$

In formula (1), $\theta_0$ is an incident angle of the incident light incident on the grating layer 30, λ is a wavelength of the incident light incident on the grating layer 30.

According to formula (1), when the incident angle $\theta_0$ of the incident light incident on the grating layer 30 is fixed, with respect to the zero-order diffraction, the diffraction angle θ of the zero-order diffraction equals to the incident angle $\theta_0$ of the incident light incident on the grating layer 30, so the grating period P of the grating layer does not have any impact on the diffraction angle of the zero-order diffraction. With respect to a non-zero-order diffraction, such as first-order diffraction, second-order diffraction, third-order diffraction, etc., as the grating period P decreases, the diffraction angle θ of the non-zero-order diffraction increases gradually. Thus by setting different grating periods P, the diffraction angle θ of the non-zero-order diffraction can be adjusted, so that light of the non-zero-order diffraction is emitted towards a set direction.

Specifically, the display device 10 comprises a left-eye field-of-view central area $A_L$ and a non left-eye field-of-view central area. The left-eye field-of-view central area $A_L$ is at a middle of the display device 10, and the non left-eye field-of-view central area surrounds the left-eye field-of-view central area $A_L$. When a viewer is viewing an image displayed by the display device 10, sight of the left eye $Z_L$ of the viewer concentrates on the left-eye field-of-view central area $A_L$. Light emitted from the left-eye field-of-view central area $A_L$ and directed at the left eye $Z_L$ of the viewer can be considered as light of zero-order diffraction obtained by the incident light passing through the grating layer 30 corresponding to the left-eye field-of-view central area $A_L$, while light emitted from the non left-eye field-of-view central area and directed at eyes of the viewer needs to be deflected so as to be directed at the eyes of the viewer, i.e. light emitted from the non left-eye field-of-view central area and directed at the eyes of the viewer can be considered as light of non-zero-order diffraction obtained by the incident light passing through the grating layer 30 corresponding to the non left-eye field-of-view central area. Therefore, the grating period of the grating layer 30 corresponding to the non left-eye field-of-view central area in FIG. 2 can be made to be smaller than the grating period of the grating layer 30 corresponding to the left-eye field-of-view central area $A_L$, so that the non-zero-order diffraction obtained by the incident light being diffracted at the grating layer 30 corresponding to the non left-eye field-of-view central area has an appropriate diffraction angle, and that light of a non-zero-order diffraction deflects towards sight of the viewer so as to be directed at the left eye $Z_L$ of the viewer. That is, the grating period of the grating layer 30 can be set so as to adjust the diffraction angle of the non-zero-order diffraction obtained by the incident light passing through an area of the grating layer 30 corresponding to the non left-eye field-of-view central area, such that the non-zero-order diffraction obtained by the incident light being diffracted at the grating layer 30 corresponding to the non left-eye field-of-view central area has an appropriate diffraction angle, and that light of the non-zero-order diffraction deflects towards the left eye $Z_L$ of the viewer so as to be directed at the left eye $Z_L$ of the viewer.

The display device 10 comprises a right-eye field-of-view central area $A_R$ and a non right-eye field-of-view central area. The right-eye field-of-view central area $A_R$ is at a middle of the display device 10, and the non right-eye field-of-view central area surrounds the right-eye field-of-view central area $A_R$. When a viewer is viewing an image displayed by the display device 10, sight of a right eye $Z_R$ of the viewer concentrates on the right-eye field-of-view central area $A_R$. Light emitted from the right-eye field-of-view central area $A_R$ and directed at the right eye $Z_R$ of the viewer can be considered as light of zero-order diffraction obtained by the incident light passing through the grating layer 30 corresponding to the right-eye field-of-view central area $A_R$, while light emitted from the non right-eye field-of-view central area and directed at eyes of the viewer needs to be deflected so as to be directed at the eyes of the viewer, i.e. light emitted from the non right-eye field-of-view central area and directed at the eyes of the viewer can be considered as light of non-zero-order diffraction obtained by the incident light passing through the grating layer 30 corresponding to the non right-eye field-of-view central area. Therefore, the grating period of the grating layer 30 corresponding to the non right-eye field-of-view central area in FIG. 2 can be made to be smaller than the grating period of the grating layer 30 corresponding to the right-eye field-of-view central area $A_R$, so that the non-zero-order diffraction obtained by the incident light being diffracted at the grating layer 30 corresponding to the non right-eye field-of-view central area has an appropriate diffraction angle, and that light of the non-zero-order diffraction deflects towards sight of the viewer so as to be directed at the right eye $Z_R$ of the viewer. That is, the grating period of the grating layer 30 can be set so as to adjust the diffraction angle of the non-zero-order diffraction obtained by the incident light passing through an area of the grating layer 30 corresponding to the non right-eye field-of-view central area, such that the non-zero-order diffraction obtained by the incident light being diffracted at the grating layer 30 corresponding to the non right-eye field-of-view central area has an appropriate diffraction angle, and that light of the non-zero-order diffraction deflects towards the right eye $Z_R$ of the viewer so as to be directed at the right eye $Z_R$ of the viewer.

For example, referring to FIG. 1, when the viewer is in the viewing area in front of the display device 10 and is viewing images displayed by the display device 10, images viewed by the viewer seem to be projected on a virtual screen 40 behind the display device 10. The image at a point Y on the virtual screen 40 as viewed by the left eye $Z_L$ of the viewer corresponds to the image at a point $X_L$ on the display device 10. Suppose that the point $X_L$ is in the non left-eye field-of-view central area of the display device 10, in order to enable the left eye $Z_L$ of the viewer to see the image at point Y on the virtual screen 40, the light exiting direction at the point $X_L$ on the display device 10 needs to be adjusted, so that light at the point $X_L$ on the display device 10 is emitted along the straight line in which $Z_L$, $X_L$ and Y are located. Specifically, a grating period P of the grating layer 30 at a position corresponding to the point $X_L$ can be set, and the diffraction angle θ of the non-zero-order diffraction obtained by the incident light being diffracted at the position of the grating layer 30 corresponding to the point $X_L$ is adjusted, such that light of the non-zero-order diffraction is emitted along the straight line in which $Z_L$, $X_L$ and Y are located, and that the image at the point Y on the virtual screen 40 is seen by the left eye $Z_L$ of the viewer.

If the point $X_L$ on the display device 10 corresponds to a left-eye R pixel, then the grating period P of the grating layer 30 corresponding to the left-eye R pixel is set, so that the non-zero-order diffraction obtained by the incident light being diffracted at a position of the grating layer 30 corresponding to the left-eye R pixel is diffracted along the straight line in which $Z_L$, $X_L$ and Y are located; if the point $X_L$ on the display device 10 corresponds to a left-eye G pixel, then the grating period P of the grating layer 30 corresponding to the left-eye G pixel is set, so that the non-zero-order diffraction obtained by the incident light being diffracted at a position of the grating layer 30 corresponding to the left-eye G pixel is diffracted along the straight line in which $Z_L$, $X_L$ and Y are located; if the point $X_L$ on the display device 10 corresponds to a left-eye B pixels, then the grating period P of the grating layer 30 corresponding to the left-eye B pixel is set, so that the non-zero-order diffraction obtained by the incident light being diffracted at a position of the grating layer 30 corresponding to the left-eye B pixel is diffracted along the straight line in which $Z_L$, $X_L$ and Y are located.

The image at a point Y on the virtual screen 40 as viewed by the right eye $Z_R$ of the viewer corresponds to the image at point $X_R$ on the display device 10. Suppose that the point $X_R$ is in the non right-eye field-of-view central area of the display device 10, in order to enable the right eye $Z_R$ of the viewer to see the image at point Y on the virtual screen 40, the light exiting direction at point $X_R$ on the display device 10 needs to be adjusted, so that light at point $X_R$ on the display device 10 is emitted along the straight line in which $Z_R$, $X_R$ and Y are located. Specifically, a grating period P of the grating layer 30 at a position corresponding to the point $X_R$ can be set, and the diffraction angle θ of the non-zero-order diffraction obtained by the incident light being diffracted at the position of the grating layer 30 corresponding to the point $X_R$ is adjusted, such that light of the non-zero-order diffraction is emitted along the straight line in which $Z_R$, $X_R$ and Y are located, and that the image at point Y on the virtual screen 40 is seen by the right eye $Z_R$ of the viewer.

If the point $X_R$ on the display device 10 corresponds to a right-eye R pixel, then the grating period P of the grating layer 30 corresponding to the right-eye R pixel is set, so that the non-zero-order diffraction obtained by the incident light being diffracted at a position of the grating layer 30 corresponding to the right-eye R pixel is diffracted along the straight line in which $Z_R$, $X_R$ and Y are located; if the point $X_R$ on the display device 10 corresponds to a right-eye G pixel, then the grating period P of the grating layer 30 corresponding to the right-eye G pixel is set, so that the non-zero-order diffraction obtained by the incident light being diffracted at a position of the grating layer 30 corresponding to the right-eye G pixel is diffracted along the straight line in which $Z_R$, $X_R$ and Y are located; if the point $X_R$ on the display device 10 corresponds to a right-eye B pixel, then the grating period P of the grating layer 30 corresponding to the right-eye B pixel is set, so that the non-zero-order diffraction obtained by the incident light being diffracted at a position of the grating layer 30 corresponding to the right-eye B pixel is diffracted along the straight line in which $Z_R$, $X_R$ and Y are located.

It can be seen that a grating layer 30 is arranged in the display device 10 provided in the embodiment of the present disclosure, and by setting the grating periods of the respective positions of the grating layer 30, the diffraction effect occurred when light is propagating in the display device 10 can be controlled, thereby controlling light propagation in the display device 10 and controlling the light emitted by the display device 10. That is, in the embodiment of the present disclosure, a structure designed on the basis of the physical optics principle is used to control light propagation in the display device 10. Compared to the structure designed on the basis of the geometrical optics principle for controlling propagation of light in the display device 10 in the prior art, the structure designed on the basis of the physical optics principle has higher ability in controlling propagation of light in the display device 10, so it can better control propagation of light in the display device 10, improve the effect of controlling of light propagation in the display device 10, improving the on-the-spot effect of the display of the display device 10 and the immersion of viewers. As a result, viewing experience of the viewer is improved by bringing more real and comfortable viewing experience to the viewer.

It shall be noted that the grating layer 30 comprises the R grating region, the G grating region and the B grating region. The R grating region comprises the left-eye R grating region corresponding to the left-eye R pixels, and the right-eye R grating region corresponding to the right-eye R pixels. The G grating region comprises the left-eye G grating region corresponding to the left-eye G pixels, and the right-eye G grating region corresponding to the right-eye G pixels. The B grating region comprises the left-eye B grating region corresponding to the left-eye B pixels, and the right-eye B grating region corresponding to the right-eye B pixels. That is, the grating layer 30 comprises a left-eye grating matching the left eye $Z_L$ and a right-eye grating matching the right eye $Z_R$. In practical application, the left-eye grating and the right-eye grating can be arranged in the same layer, or the grating layer 30 may include stacked left-eye grating layer and right-eye grating layer, the left-eye grating being in the left-eye grating layer and the right-eye grating being in the right-eye grating layer. Of course, in practical application, the grating layer 30 may include a R grating layer, a G grating layer and a B grating layer stacked on one another, the left-eye R grating region and the right-eye R grating region are in the R grating layer, the left-eye G grating region and the right-eye G grating region are in the G grating layer, and the left-eye B grating region and the right-eye B grating region are in the B grating layer. Alternatively, the grating layer may include a left-eye R grating layer, a left-eye G grating layer, a left-eye B grating layer, a right-eye R grating layer, a right-eye G grating layer, and a right-eye B grating layer stacked on one another; the left-eye R grating region is in the left-eye R grating layer, the left-eye G grating region is in the left-eye G grating layer, the left-eye B grating region is in the left-eye B grating layer, the right-eye R grating region is in the right-eye R grating layer, the right-eye G grating region is in the right-eye G grating layer, and the right-eye B grating region is in the right-eye B grating layer.

In practical application, according to different functions of the display device 10 as well as different positions of the viewing area in front of the display device 10, positions of the left-eye field-of-view central area $A_L$ and the right-eye field-of-view central area $A_R$ can vary. For example, for some display devices 10, the position of the left-eye field-of-view central area $A_L$ and the position of the right-eye field-of-view central area $A_R$ are both at the left side in FIG. 2. In this case, the non left-eye field-of-view central area and the non right-eye field-of-view central area are both at the right side in FIG. 2. Alternatively, for some display devices 10, the position of the left-eye field-of-view central area $A_L$ and the position of the right-eye field-of-view central area $A_R$ are both at the right side in FIG. 2. In this case, the non left-eye field-of-view central area and the non right-eye field-of-view central area are both at the left side in FIG. 2.

It shall be noted that the incident light incident on the grating layer 30 is diffracted at the grating layer 30 to obtain a kth-order diffraction (k=0, ±1, ±2K). When adjusting the light exiting direction at each position on the display device 10, the grating period in a position of the grating layer 30 corresponding to the position is usually adjusted so as to adjust the diffraction angle of a non-zero-order diffraction obtained by diffraction of the incident light when passing through the position of the grating layer 30 corresponding to the position on the display device 10. For example, usually the grating period in the position of the grating layer 30 corresponding to the position on the display device 10 is adjusted so as to adjust the diffraction angles of first-order diffraction, second-order diffraction, third-order diffraction, and so on. In practical application, the incident light incident on the grating layer 30 is diffracted at the grating layer 30 to obtain a kth-order diffraction (k=0, ±1, ±2K), wherein the zero-order diffraction has the highest intensity, and as |k| increases, the intensity of the kth-order diffraction decreases gradually, and generally speaking, there is a difference of one or several orders of magnitude between the intensity of second-order diffraction and the intensity of first-order diffraction, i.e. the intensity of the second-order diffraction is much smaller than that of the first-order diffraction. Therefore, when adjusting the diffraction angle of a non-zeroorder diffraction obtained by diffraction of the incident light when passing through the position of the grating layer 30 corresponding to the position on the display device 10, only the diffraction angle of the first-order diffraction needs to be adjusted.

In an embodiment of the present disclosure, description is given by taking an example of adjusting a diffraction angle of a first-order diffraction obtained by diffraction of the incident light passing through the grating layer 30, and description is also given by taking an example of respectively adjusting an intensity of a zero-order diffraction and an intensity of a first-order diffraction obtained by diffraction of the incident light passing through the grating layer 30.

In the above embodiment, according to different functions of the display device 10 and different positions of the viewing area in front of the display device 10, the grating layer 30 can be arranged in different ways.

Referring to FIGS. 1-4 and 6, which show an arrangement of the grating layer 30, along a lateral direction of the display device 10, from the center $a_L$ of the left-eye field-of-view central area $A_L$ to both sides of the display device 10, the grating period of the left-eye R grating region, the grating period of the left-eye G grating region, and the grating period of the left-eye B grating region all decrease gradually; and along the lateral direction of the display device 10, from the center $a_R$ of the right-eye field-of-view central area $A_R$ to both sides of the display device 10, the grating period of the right-eye R grating region, the grating period of the right-eye G grating region, and the grating period of the right-eye B grating region all decrease gradually.

Specifically, an example that the display device 10 has a size of 60 inches is described. The display device 10 has a width of 132.83 cm and a height of 74.72 cm. For example, as shown in FIG. 2, the left-and-right direction in FIG. 2 is the width direction of the display device 10, and the up-and-down direction in FIG. 2 is the height direction of the display device 10. The display device 10 has a center, the viewing area of the display device 10 is directly in front of the display device 10 and is facing a center of the display device 10 in the width direction.

The lateral direction of the display device 10 can be considered as a direction parallel to a line between the left eye $Z_L$ and the right eye $Z_R$ of the viewer, and the longitudinal direction of the display device 10 can be considered as a direction perpendicular to the line between the left eye $Z_L$ and the right eye $Z_R$ of the viewer. With respect to the above display device 10, its width direction is parallel to the line between the left eye $Z_L$ and the right eye $Z_R$ of the viewer, that is, the left-and-right direction in FIG. 2 is the lateral direction of the display device 10, and the up-and-down direction in FIG. 2 is the longitudinal direction of the display device 10.

The left-eye field-of-view central area $A_L$ is at the center a of the display device 10 but to the left, i.e. the left-eye field-of-view central area $A_L$ is at the center of the display device 10 but to the left in FIG. 2, the center $a_L$ of the left-eye field-of-view central area $A_L$ is at the center of the display device 10 but to the left, and the non left-eye field-of-view central area is at the left and right sides of the left-eye field-of-view central area $A_L$ in FIG. 2. The right-eye field-of-view central area $A_R$ is at the center of the display device 10 but to the right, i.e. the right-eye field-of-view central area $A_R$ is at the center of the display device 10 but to the right in FIG. 2, the center $a_R$ of the right-eye field-of-view central area $A_R$ is at the center of the display device 10 but to the right in FIG. 2, and the non right-eye field-of-view central area is at the left and right sides of the right-eye field-of-view central area $A_R$ in FIG. 2. The center $a_L$ of the left-eye field-of-view central area $A_L$ and the center $a_R$ of the right-eye field-of-view central area $A_R$ are symmetrical relative to a lateral center line of the display device 10, i.e. the center $a_L$ of the left-eye field-of-view central area $A_L$ and the center $a_R$ of the right-eye field-of-view central area $A_R$ are bilaterally symmetrical relative to the center a of the display device 10 in FIG. 2, and the center $a_L$ of the left-eye field-of-view central area $A_L$, the center $a_R$ of the right-eye field-of-view central area $A_R$ and the center a of the display device 10 are on the same straight line.

When the viewer is viewing an image displayed by the display device 10, a distance between the viewer and the display device 10 may be greater than 0 m and smaller than 500 m. In order to enable the viewer to have a good viewing angle, the distance between the viewer and the display device 10 can be 0.5 m, for example.

A vertical line $q_{4L1}$ is provided through the center $a_L$ of the left-eye field-of-view central area $A_L$ in FIG. 2. Along the lateral direction of the display device 10, from the vertical line $q_{4L1}$ to the left and right sides of the display device 10 in FIG. 2, the grating period of the left-eye R grating region, the grating period of the left-eye G grating region, and the grating period of the left-eye B grating region all decrease gradually. That is, along the lateral direction of the display device 10, the farther from the vertical line $q_{4L1}$, the larger the diffraction angle of the first-order diffraction obtained by diffraction of the incident light when passing through the left-eye R grating region, the larger the diffraction angle of the first-order diffraction obtained by diffraction of the incident light when passing through the left-eye G grating region, and the larger the diffraction angle of the first-order diffraction obtained by diffraction of the incident light when passing through the left-eye B grating region, which are corresponding to the angles by which the light emitted from different positions on the display device 10 need to deflect towards the left eye $Z_L$ of the viewer as shown by the curve $q_{1L}$ in FIG. 4.

Figure 4:
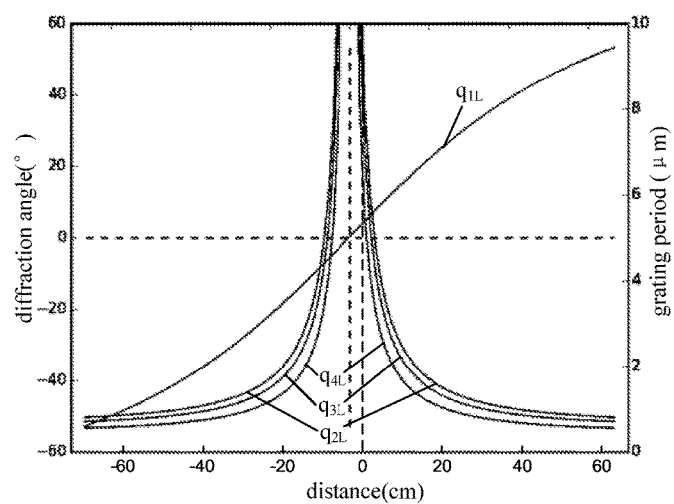
FIG. 4 is a graph of a grating period of a grating layer corresponding to a left eye.

Along the lateral direction of the display device 10, a distribution curve of the grating period of the left-eye R grating region can be obtained from the curve $q_{1L}$ in FIG. 4 and formula (1). As shown by the curve $q_{2L}$ in FIG. 4, an area of the left-eye R grating region corresponding to the vertical line $q_{4L1}$ has the largest grating period, and areas of the left-eye R grating region corresponding to the left and right sides of the display device 10 in FIG. 2 have a smaller grating period. For example, the area of the left-eye R grating region corresponding to the vertical line $q_{4L1}$ may have a grating period greater than or equal to 50 μm, and the areas of the left-eye R grating region corresponding to the left and right sides of the display device 10 in FIG. 2 may have a grating period of 0.8 μm.

Along the lateral direction of the display device 10, a distribution curve of the grating period of the left-eye G grating region can be obtained from the curve $q_{1L}$ in FIG. 4 and formula (1). As shown by the curve $q_{3L}$ in FIG. 4, an area of the left-eye G grating region corresponding to the vertical line $q_{4L1}$ has the largest grating period, and areas of the left-eye G grating region corresponding to the left and right sides of the display device 10 in FIG. 2 have a smaller grating period. For example, the area of the left-eye G grating region corresponding to the vertical line $q_{4L1}$ may have a grating period greater than or equal to 50 μm, and the areas of the left-eye G grating region corresponding to the left and right sides of the display device 10 in FIG. 2 may have a grating period of 0.7 μm.

Along the lateral direction of the display device 10, a distribution curve of the grating period of the left-eye B grating region can be obtained from the curve $q_{1L}$ in FIG. 4 and formula (1). As shown by the curve $q_{4L}$ in FIG. 4, an area of the left-eye B grating region corresponding to the vertical line $q_{4L1}$ has the largest grating period, and areas of the left-eye B grating region corresponding to the left and right sides of the display device 10 in FIG. 2 have a smaller grating period. For example, the area of the left-eye B grating region corresponding to the vertical line $q_{4L1}$ may have a grating period greater than or equal to 50 μm, and the areas of the left-eye B grating region corresponding to the left and right sides of the display device 10 in FIG. 2 may have a grating period of 0.5 μm.

A vertical line $q_{4R1}$ is provided through the center $a_R$ of the right-eye field-of-view central area $A_R$ in FIG. 2. Along the lateral direction of the display device 10, from the vertical line $q_{4R1}$ to the left and right sides of the display device 10 in FIG. 2, the grating period of the right-eye R grating region, the grating period of the right-eye G grating region, and the grating period of the right-eye B grating region all decrease gradually. That is, the farther from the vertical line $q_{4R1}$, the larger the diffraction angle of the first-order diffraction obtained by diffraction of the incident light when passing through the right-eye R grating region, the larger the diffraction angle of the first-order diffraction obtained by diffraction of the incident light when passing through the right-eye G grating region, and the larger the diffraction angle of the first-order diffraction obtained by diffraction of the incident light when passing through the right-eye B grating region, which are corresponding to the angles by which the light emitted from different positions on the display device 10 need to deflect towards the right eye $Z_R$ of the viewer as shown by the curve $q_{1R}$ in FIG. 6.

Figure 6:
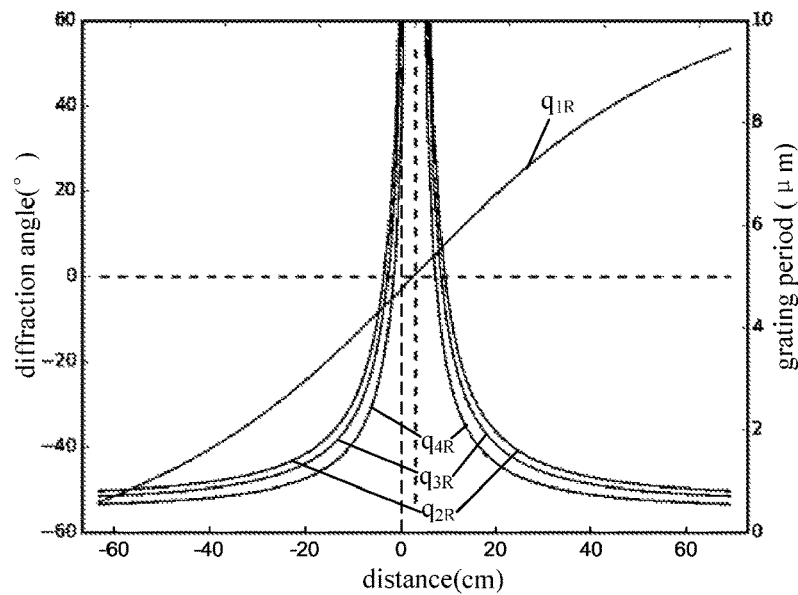
FIG. 6 is a graph of a grating period of the grating layer corresponding to a right eye.

Along the lateral direction of the display device 10, a distribution curve of the grating period of the right-eye R grating region can be obtained from the curve $q_{1R}$ in FIG. 6 and formula (1). As shown by the curve $q_{2R}$ in FIG. 6, an area of the right-eye R grating region corresponding to the vertical line $q_{4R1}$ has the largest grating period, and areas of the right-eye R grating region corresponding to the left and right sides of the display device 10 in FIG. 2 have a smaller grating period. For example, the area of the right-eye R grating region corresponding to the vertical line $q_{4R1}$ may have a grating period greater than or equal to 50 μm, and the areas of the right-eye R grating region corresponding to the left and right sides of the display device 10 in FIG. 2 may have a grating period of 0.8 μm.

Along the lateral direction of the display device 10, a distribution curve of the grating period of the right-eye G grating region can be obtained from the curve $q_{1R}$ in FIG. 6 and formula (1). As shown by the curve $q_{3R}$ in FIG. 6, an area of the right-eye G grating region corresponding to the vertical line $q_{4R1}$ has the largest grating period, and areas of the right-eye G grating region corresponding to the left and right sides of the display device 10 in FIG. 2 have a smaller grating period. For example, the area of the right-eye G grating region corresponding to the vertical line $q_{4R1}$ may have a grating period greater than or equal to 50 μm, and the areas of the right-eye G grating region corresponding to the left and right sides of the display device 10 in FIG. 2 may have a grating period of 0.7 μm.

Along the lateral direction of the display device 10, a distribution curve of the grating period of the right-eye B grating region can be obtained from the curve $q_{1R}$ in FIG. 6 and formula (1). As shown by the curve $q_{4R}$ in FIG. 6, an area of the right-eye B grating region corresponding to the vertical line $q_{4R1}$ has the largest grating period, and areas of the right-eye B grating region corresponding to the left and right sides of the display device 10 in FIG. 2 have a smaller grating period. For example, the area of the right-eye B grating region corresponding to the vertical line $q_{4R1}$ may have a grating period greater than or equal to 50 μm, and the areas of the right-eye B grating region corresponding to the left and right sides of the display device 10 in FIG. 2 may have a grating period of 0.5 μm.

In such an arrangement of the grating layer 30, by setting the grating period of the left-eye R grating region, the grating period of the left-eye G grating region, the grating period of the left-eye B grating region, grating period of the right-eye R grating region, the grating period of the right-eye G grating region, the grating period of the right-eye B grating region, respectively, red light obtained through the left-eye R pixels and the right-eye R pixels, green light obtained through the left-eye G pixels and the right-eye G pixels, and blue light obtained through the left-eye B pixels and the right-eye B pixels can be adjusted and controlled, so that the red light, green light and blue light emitted from individual positions on the display device 10 are emitted along preset directions so as to improve the on-the-spot effect of the display of the display device 10 and the immersion of the viewer, improve viewing experience of the viewer and bring more real and comfortable viewing experience to the viewer.

In such an arrangement of the grating layer 30, along the lateral direction of the display device 10, from the center $a_L$ of the left-eye field-of-view central area $A_L$ to both sides of the display device 10, the grating period of the left-eye R grating region, the grating period of the left-eye G grating region, and the grating period of the left-eye B grating region all decrease gradually; and from the center $a_R$ of the right-eye field-of-view central area $A_R$ to both sides of the display device 10, the grating period of the right-eye R grating region, the grating period of the right-eye G grating region, and the grating period of the right-eye B grating region all decrease gradually. Therefore, such an arrangement of the grating layer 30 can enable adjustment of the light exiting direction of the display device 10 along the lateral direction of the display device 10, thereby improving viewing experience of the viewer along the lateral direction of the display device 10.

Such an arrangement of the grating layer 30 can enable adjustment of the light exiting direction of the display device 10 along the lateral direction of the display device 10, thereby improving viewing experience of the viewer along the lateral direction of the display device 10. In this case, along the longitudinal direction of the display device 10, from a midpoint of a line between the center $a_L$ of the left-eye field-of-view central area $A_L$ and the center $a_R$ of the right-eye field-of-view central area $A_R$ to both sides of the display device 10, the grating period of the R grating region, the grating period of the G grating region, and the grating period of the B grating region all decrease gradually. That is, along the longitudinal direction of the display device 10, the grating period of the grating layer 30 may not be set specifically for the left eye $Z_L$ and the right eye $Z_R$.

Referring to FIGS. 1, 2, 3, 5 and 7 which show another arrangement of the grating layer 30, along the longitudinal direction of the display device 10, from the center $a_L$ of the left-eye field-of-view central area $A_L$ to both sides of the display device 10, the grating period of the left-eye R grating region, the grating period of the left-eye G grating region, and the grating period of the left-eye B grating region all decrease gradually; and along the longitudinal direction of the display device 10, from the center $a_R$ of the right-eye field-of-view central area $A_R$ to both sides of the display device 10, the grating period of the right-eye R grating region, the grating period of the right-eye G grating region, and the grating period of the right-eye B grating region all decrease gradually.

Specifically, an example that the display device 10 has a size of 60 inches is described. The display device 10 has a width of 132.83 cm and a height of 74.72 cm. For example, as shown in FIG. 2, the left-and-right direction in FIG. 2 is the width direction of the display device 10, and the up-and-down direction in FIG. 2 is the height direction of the display device 10. The display device 10 has a center a, the viewing area of the display device 10 is directly in front of the display device 10 and is facing the center of the display device 10 in the width direction.

The lateral direction of the display device 10 can be considered as a direction parallel to a line between the left eye $Z_L$ and the right eye $Z_R$ of the viewer, and the longitudinal direction of the display device 10 can be considered as a direction perpendicular to the line between the left eye $Z_L$ and the right eye $Z_R$ of the viewer. With respect to the above display device 10, its width direction is parallel to the line between the left eye $Z_L$ and the right eye $Z_R$ of the viewer, that is, the left-and-right direction in FIG. 2 is the lateral direction of the display device 10, and the up-and-down direction in FIG. 2 is the longitudinal direction of the display device 10.

The left-eye field-of-view central area $A_L$ is at the center a of the display device 10 but to the left, i.e. the left-eye field-of-view central area $A_L$ is at the center a of the display device 10 but to the left in FIG. 2, the center $a_L$ of the left-eye field-of-view central area $A_L$ is at the center a of the display device 10 but to the left, and the non left-eye field-of-view central area is at the left and right sides of the left-eye field-of-view central area $A_L$ in FIG. 2. The right-eye field-of-view central area $A_R$ is at the center a of the display device 10 but to the right, i.e. the right-eye field-of-view central area $A_R$ is at the center a of the display device 10 but to the right in FIG. 2, the center $a_R$ of the right-eye field-of-view central area $A_R$ is at the center a of the display device 10 but to the right, and the non right-eye field-of-view central area is at the left and right sides of the right-eye field-of-view central area $A_R$ in FIG. 2. The center $a_L$ of the left-eye field-of-view central area $A_L$ and the center $a_R$ of the right-eye field-of-view central area $A_R$ are symmetrical relative to a lateral center line of the display device 10, i.e. the center $a_L$ of the left-eye field-of-view central area $A_L$ and the center $a_R$ of the right-eye field-of-view central area $A_R$ are bilaterally symmetrical relative to the center a of the display device 10 in FIG. 2, and the center $a_L$ of the left-eye field-of-view central area $A_L$, the center $a_R$ of the right-eye field-of-view central area $A_R$ and the center a of the display device 10 are on the same straight line.

When the viewer is viewing an image displayed by the display device 10, a distance between the viewer and the display device 10 may be greater than 0 m and smaller than 500 m. In order to enable the viewer to have a good viewing angle, the distance between the viewer and the display device 10 can be 0.5 m, for example.

A transverse line $q_{4L2}$ is provided through the center $a_L$ of the left-eye field-of-view central area $A_L$ in FIG. 2. Along the longitudinal direction of the display device 10, from the transverse line $q_{4L2}$ to the upper and lower sides of the display device 10 in FIG. 2, the grating period of the left-eye R grating region, the grating period of the left-eye G grating region, and the grating period of the left-eye B grating region all decrease gradually. That is, the farther from the transverse line $q_{4L2}$, the larger the diffraction angle of the first-order diffraction obtained by diffraction of the incident light when passing through the left-eye R grating region, the larger the diffraction angle of the first-order diffraction obtained by diffraction of the incident light when passing through the left-eye G grating region, and the larger the diffraction angle of the first-order diffraction obtained by diffraction of the incident light when passing through the left-eye B grating region, which are corresponding to the angles by which the light emitted from different positions on the display device 10 need to deflect towards the left eye $Z_L$ of the viewer as shown by the curve $q_{5L}$ in FIG. 5.

Figure 5:
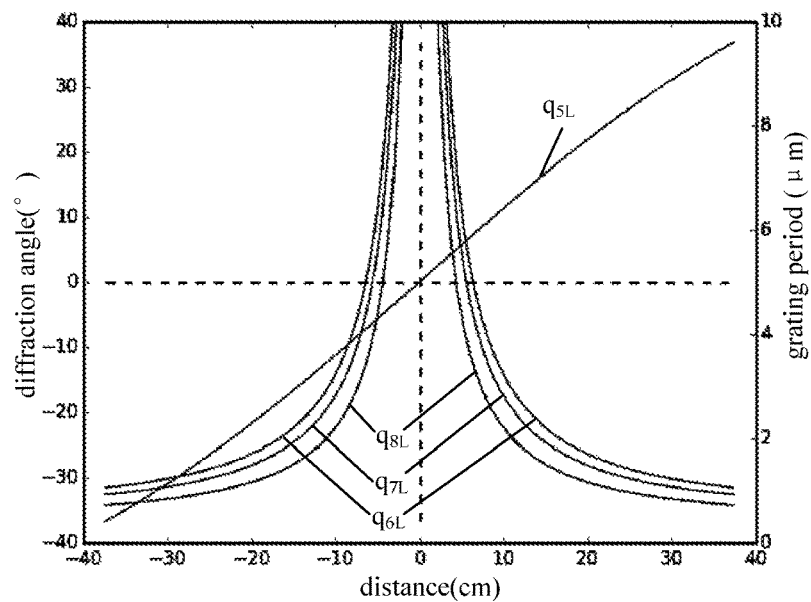
FIG. 5 is a graph of a grating period of a grating layer corresponding to a left eye.

Along the longitudinal direction of the display device 10, a distribution curve of the grating period of the left-eye R grating region can be obtained from the curve $q_{5L}$ in FIG. 5 and formula (1). As shown by the curve $q_{6L}$ in FIG. 5, an area of the left-eye R grating region corresponding to the transverse line $q_{4L2}$ has the largest grating period, and areas of the left-eye R grating region corresponding to the upper and lower sides of the display device 10 in FIG. 2 have a smaller grating period. For example, the area of the left-eye R grating region corresponding to the transverse line $q_{4L2}$ may have a grating period greater than or equal to 50 μm, and the areas of the left-eye R grating region corresponding to the upper and lower sides of the display device 10 in FIG. 2 may have a grating period of 0.8 μm.

Along the longitudinal direction of the display device 10, a distribution curve of the grating period of the left-eye G grating region can be obtained from the curve $q_{5L}$ in FIG. 5 and formula (1). As shown by the curve $q_{7L}$ in FIG. 5, an area of the left-eye G grating region corresponding to the transverse line $q_{4L2}$ has the largest grating period, and areas of the left-eye G grating region corresponding to the upper and lower sides of the display device 10 in FIG. 2 have a smaller grating period. For example, the area of the left-eye G grating region corresponding to the transverse line $q_{4L2}$ may have a grating period greater than or equal to 50 μm, and the areas of the left-eye G grating region corresponding to the upper and lower sides of the display device 10 in FIG. 2 may have a grating period of 0.7 μm.

Along the longitudinal direction of the display device 10, a distribution curve of the grating period of the left-eye B grating region can be obtained from the curve $q_{5L}$ in FIG. 5 and formula (1). As shown by the curve $q_{8L}$ in FIG. 5, an area of the left-eye B grating region corresponding to the transverse line $q_{4L2}$ has the largest grating period, and areas of the left-eye B grating region corresponding to the upper and lower sides of the display device 10 in FIG. 2 have a smaller grating period. For example, the area of the left-eye B grating region corresponding to the transverse line $q_{4L2}$ may have a grating period greater than or equal to 50 μm, and the areas of the left-eye B grating region corresponding to the upper and lower sides of the display device 10 in FIG. 2 may have a grating period of 0.5 μm.

A transverse line $q_{4R2}$ is provided through the center $a_R$ of the right-eye field-of-view central area $A_R$ in FIG. 2. Along the longitudinal direction of the display device 10, from the transverse line $q_{4R2}$ to the upper and lower sides of the display device 10 in FIG. 2, the grating period of the right-eye R grating region, the grating period of the right-eye G grating region, and the grating period of the right-eye B grating region all decrease gradually. That is, the farther from the transverse line $q_{4R2}$, the larger the diffraction angle of the first-order diffraction obtained by diffraction of the incident light when passing through the right-eye R grating region, the larger the diffraction angle of the first-order diffraction obtained by diffraction of the incident light when passing through the right-eye G grating region, and the larger the diffraction angle of the first-order diffraction obtained by diffraction of the incident light when passing through the right-eye B grating region, which are corresponding to the angles by which the light emitted from different positions on the display device 10 need to deflect towards the right eye $Z_R$ of the viewer as shown by the curve $q_{5R}$ in FIG. 7.

Figure 7:
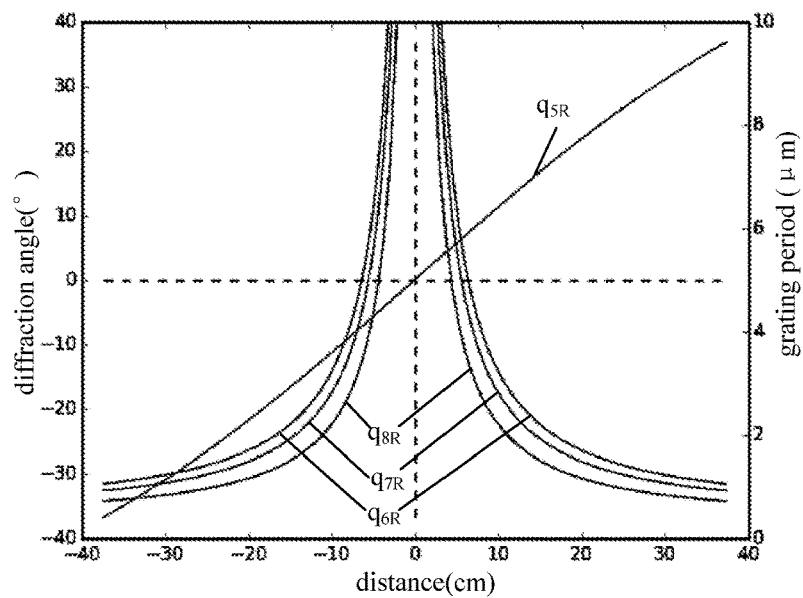
FIG. 7 is a graph of a grating period of the grating layer corresponding to a right eye.

Along the longitudinal direction of the display device 10, a distribution curve of the grating period of the right-eye R grating region can be obtained from the curve $q_{5R}$ in FIG. 7 and formula (1). As shown by the curve $q_{6R}$ in FIG. 7, an area of the right-eye R grating region corresponding to the transverse line $q_{4R2}$ has the largest grating period, and areas of the right-eye R grating region corresponding to the upper and lower sides of the display device 10 in FIG. 2 have a smaller grating period. For example, the area of the right-eye R grating region corresponding to the transverse line $q_{4R2}$ may have a grating period greater than or equal to 50 μm, and the areas of the right-eye R grating region corresponding to the upper and lower sides of the display device 10 in FIG. 2 may have a grating period of 0.8 μm.

Along the longitudinal direction of the display device 10, a distribution curve of the grating period of the right-eye G grating region can be obtained from the curve $q_{5R}$ in FIG. 7 and formula (1). As shown by the curve $q_{7R}$ in FIG. 7, an area of the right-eye G grating region corresponding to the transverse line $q_{4R2}$ has the largest grating period, and areas of the right-eye G grating region corresponding to the upper and lower sides of the display device 10 in FIG. 2 have a smaller grating period. For example, the area of the right-eye G grating region corresponding to the transverse line $q_{4R2}$ may have a grating period greater than or equal to 50 μm, and the areas of the right-eye G grating region corresponding to the upper and lower sides of the display device 10 in FIG. 2 may have a grating period of 0.7 μm.

Along the longitudinal direction of the display device 10, a distribution curve of the grating period of the right-eye B grating region can be obtained from the curve $q_{5R}$ in FIG. 7 and formula (1). As shown by the curve $q_{8R}$ in FIG. 7, an area of the right-eye B grating region corresponding to the transverse line $q_{4R2}$ has the largest grating period, and areas of the right-eye B grating region corresponding to the upper and lower sides of the display device 10 in FIG. 2 have a smaller grating period. For example, the area of the right-eye B grating region corresponding to the transverse line $q_{4R2}$ may have a grating period greater than or equal to 50 μm, and the areas of the right-eye B grating region corresponding to the upper and lower sides of the display device 10 in FIG. 2 may have a grating period of 0.5 μm.

In such an arrangement of the grating layer 30, by setting the grating period of the left-eye R grating region, the grating period of the left-eye G grating region, the grating period of the left-eye B grating region, grating period of the right-eye R grating region, the grating period of the right-eye G grating region, the grating period of the right-eye B grating region, respectively, red light obtained through the left-eye R pixels and the right-eye R pixels, green light obtained through the left-eye G pixels and the right-eye G pixels, and blue light obtained through the left-eye B pixels and the right-eye B pixels can be adjusted and controlled, so that the red light, green light and blue light emitted from individual positions on the display device 10 are emitted along preset directions so as to improve the on-the-spot effect of the display of the display device and the immersion of the viewer, improve viewing experience of the viewer and bring more real and comfortable viewing experience to the viewer.

In such an arrangement of the grating layer 30, along the longitudinal direction of the display device 10, from the center $a_L$ of the left-eye field-of-view central area $A_L$ to both sides of the display device 10, the grating period of the left-eye R grating region, the grating period of the left-eye G grating region, and the grating period of the left-eye B grating region all decrease gradually; and from the center $a_R$ of the right-eye field-of-view central area $A_R$ to both sides of the display device 10, the grating period of the right-eye R grating region, the grating period of the right-eye G grating region, and the grating period of the right-eye B grating region all decrease gradually. Therefore, such an arrangement of the grating layer 30 can enable adjustment of the light exiting direction of the display device 10 along the longitudinal direction of the display device 10, thereby improving viewing experience of the viewer along the longitudinal direction of the display device 10.

Such an arrangement of the grating layer 30 can enable adjustment of the light exiting direction of the display device 10 along the longitudinal direction of the display device 10, thereby improving viewing experience of the viewer along the longitudinal direction of the display device 10. In this case, along the lateral direction of the display device 10, from a midpoint of the line between the center $a_L$ of the left-eye field-of-view central area $A_L$ and the center $a_R$ of the right-eye field-of-view central area $A_R$ to both sides of the display device 10, the grating period of the R grating region, the grating period of the G grating region, and the grating period of the B grating region all decrease gradually. That is, along the lateral direction of the display device 10, the grating period of the grating layer 30 may not be set specifically for the left eye $Z_L$ and the right eye $Z_R$.

The display device 10 provided by the above two arrangements of the grating layer 30 can improve the viewing experience of the viewer along the lateral direction of the display device 10 and the viewing experience of the viewer along the longitudinal direction of the display device 10, respectively, so in practical application, the viewing experience of the viewer along both the lateral direction and the longitudinal direction can be improved.

In yet another arrangement of the grating layer 30, along the lateral direction of the display device 10, from the center $a_L$ of the left-eye field-of-view central area $A_L$ to both sides of the display device 10, the grating period of the left-eye R grating region, the grating period of the left-eye G grating region, the grating period of the left-eye B grating region all decrease gradually; along the lateral direction of the display device 10, from the center $a_R$ of the right-eye field-of-view central area $A_R$ to both sides of the display device 10, the grating period of the right-eye R grating region, the grating period of the right-eye G grating region, the grating period of the right-eye B grating region all decrease gradually; along the longitudinal direction of the display device 10, from the center $a_L$ of the left-eye field-of-view central area $A_L$ to both sides of the display device 10, the grating period of the left-eye R grating region, the grating period of the left-eye G grating region, the grating period of the left-eye B grating region all decrease gradually; and along the longitudinal direction of the display device 10, from the center $a_R$ of the right-eye field-of-view central area $A_R$ to both sides of the display device 10, the grating period of the right-eye R grating region, the grating period of the right-eye G grating region, the grating period of the right-eye B grating region all decrease gradually.

In such an arrangement of the grating layer 30, the grating period of the grating layer 30 is set along the lateral and longitudinal directions of the display device 10 respectively, so the light exiting direction of the display device 10 can be adjusted along the lateral and longitudinal directions of the display device 10 at the same time, thereby improving the viewing experience of the viewer along the lateral and longitudinal directions of the display device 10. Along the lateral direction of the display device 10, the grating period of the left-eye R grating region, the grating period of the left-eye G grating region, the grating period of the left-eye B grating region are set in a way similar to that of the grating layer 30 as shown in FIG. 4, and the grating period of the right-eye R grating region, the grating period of the right-eye G grating region, the grating period of the right-eye B grating region are set in a way similar to that of the grating layer 30 as shown in FIG. 6, which will not be elaborated any more. Along the longitudinal direction of the display device 10, the grating period of the left-eye R grating region, the grating period of the left-eye G grating region, the grating period of the left-eye B grating region are set in a way similar to that of the grating layer 30 as shown in FIG. 5, and the grating period of the right-eye R grating region, the grating period of the right-eye G grating region, the grating period of the right-eye B grating region are set in a way similar to that of the grating layer 30 as shown in FIG. 7, which will not be elaborated any more.

It shall be noted that in such an arrangement of the grating layer 30, the grating layer 30 may include a lateral grating that can be arranged along the lateral direction of the display device 10 and a longitudinal grating that can be arranged along the longitudinal direction of the display device 10. The lateral grating and the longitudinal grating can be arranged in a same layer, or the grating layer 30 may be divided into a lateral layer and a longitudinal layer, with the lateral grating being on the lateral layer and the longitudinal grating being on the longitudinal layer.

In the above embodiment, the display panel 20 comprises a plurality of left-eye R pixels, a plurality of left-eye G pixels, a plurality of left-eye B pixels, a plurality of right-eye R pixels, a plurality of right-eye G pixels, and a plurality of right-eye B pixels, wherein the plurality of left-eye R pixels, the plurality of left-eye G pixels, the plurality of left-eye B pixels, the plurality of right-eye R pixels, the plurality of right-eye G pixels, and the plurality of right-eye B pixels may have various ways of arrangement, namely, in the display panel 20, the pixels may have various ways of arrangement.

For example, in one way of arrangement of the pixels, along the lateral direction of the display device 10, the display device 10 comprises a plurality of columns of left-eye R pixels, a plurality of columns of left-eye G pixels, a plurality of columns of left-eye B pixels, a plurality of columns of right-eye R pixels, a plurality of columns of right-eye G pixels, and a plurality of columns of right-eye B pixels. The columns of left-eye R pixels, the columns of left-eye G pixels, the columns of left-eye B pixels, the columns of right-eye R pixels, the columns of right-eye G pixels, and the columns of right-eye B pixels are arranged alternately, wherein the columns of left-eye R pixels consist of a plurality of left-eye R pixels arranged along the longitudinal direction of the display device 10, the columns of left-eye G pixels consist of a plurality of left-eye G pixels arranged along the longitudinal direction of the display device 10, the columns of left-eye B pixels consist of a plurality of left-eye B pixels arranged along the longitudinal direction of the display device 10, the columns of right-eye R pixels consist of a plurality of right-eye R pixels arranged along the longitudinal direction of the display device 10, the columns of right-eye G pixels consist of a plurality of right-eye G pixels arranged along the longitudinal direction of the display device 10, and the columns of right-eye B pixels consist of a plurality of right-eye B pixels arranged along the longitudinal direction of the display device 10.

Specifically, the plurality of left-eye R pixels, the plurality of left-eye G pixels, the plurality of left-eye B pixels, the plurality of right-eye R pixels, the plurality of right-eye G pixels, and the plurality of right-eye B pixels are arranged in an array, i.e. the plurality of left-eye R pixels, the plurality of left-eye G pixels, the plurality of left-eye B pixels, the plurality of right-eye R pixels, the plurality of right-eye G pixels, and the plurality of right-eye B pixels form a pixel array, which comprises a plurality of rows of pixels extending along the lateral direction of the display device 10 and a plurality of columns of pixels extending along the longitudinal direction of the display device 10. Each row of pixels comprises a plurality of left-eye R pixels, a plurality of left-eye G pixels, a plurality of left-eye B pixels, a plurality of right-eye R pixels, a plurality of right-eye G pixels, and a plurality of right-eye B pixels, and the left-eye R pixels, left-eye G pixels, left-eye B pixels, right-eye R pixels, right-eye G pixels, and right-eye B pixels are arranged alternately. For example, the arrangement may be in the order of a left-eye R pixel, a left-eye G pixel, a left-eye B pixel, a right-eye R pixel, a right-eye G pixel, and a right-eye B pixel, or the arrangement may be in the order of a left-eye R pixel, a right-eye R pixel, a left-eye G pixel, a right-eye G pixel, a left-eye B pixel, and a right-eye B pixel. In practical application, other alternating arrangements may be adopted, which are not limited herein. Each column of pixels comprises one of the left-eye R pixels, the left-eye G pixels, the left-eye B pixels, the right-eye R pixels, the right-eye G pixels, and the right-eye B pixels, and forms a column of the left-eye R pixels, a column of left-eye G pixels, a column of left-eye B pixels, a column of right-eye R pixels, a column of right-eye G pixels, or a column of right-eye B pixels.

When pixels in the display panel 20 are arranged in this way, and the grating layer 30 is arranged in the way as shown in FIGS. 4 and 6, the grating layer 30 comprises a plurality of grating bulges 31, which are strip-shaped grating bulges 31. The grating bulges 31 extend along the longitudinal direction of the display device 10, and the grating bulges 31 are arranged in parallel along the lateral direction of the display device 10. In this case, the grating bulges 31 of the left-eye R grating region, the grating bulges 31 of the left-eye G grating region, the grating bulges 31 of the left-eye B grating region, the grating bulges 31 of the right-eye R grating region, the grating bulges 31 of the right-eye G grating region, and the grating bulges 31 of the right-eye B grating region are all strip-shaped grating bulges 31. The grating bulges 31 extend along the longitudinal direction of the display device 10, and the grating period of the left-eye R grating region, the grating period of the left-eye G grating region, the grating period of the left-eye B grating region, the grating period of the right-eye R grating region, the grating period of the right-eye G grating region, and the grating period of the right-eye B grating region can be set in the way of setting the grating layer 30 as shown in FIGS. 4 and 6.

In another way of arrangement of the pixels, along the longitudinal direction of the display device 10, the display device 10 comprises a plurality of rows of left-eye R pixels, a plurality of rows of left-eye G pixels, a plurality of rows of left-eye B pixels, a plurality of rows of right-eye R pixels, a plurality of rows of right-eye G pixels, and a plurality of rows of right-eye B pixels. The rows of left-eye R pixels, the rows of left-eye G pixels, the rows of left-eye B pixels, the rows of right-eye R pixels, the rows of right-eye G pixels, and the rows of right-eye B pixels are arranged alternately, wherein the rows of left-eye R pixels consist of a plurality of left-eye R pixels arranged along the lateral direction of the display device 10, the rows of left-eye G pixels consist of a plurality of left-eye G pixels arranged along the lateral direction of the display device 10, the rows of left-eye B pixels consist of a plurality of left-eye B pixels arranged along the lateral direction of the display device 10, the rows of right-eye R pixels consist of a plurality of right-eye R pixels arranged along the lateral direction of the display device 10, the rows of right-eye G pixels consist of a plurality of right-eye G pixels arranged along the lateral direction of the display device 10, and the rows of right-eye B pixels consist of a plurality of right-eye B pixels arranged along the lateral direction of the display device 10.

Specifically, the plurality of left-eye R pixels, the plurality of left-eye G pixels, the plurality of left-eye B pixels, the plurality of right-eye R pixels, the plurality of right-eye G pixels, and the plurality of right-eye B pixels are arranged in an array, i.e. the plurality of left-eye R pixels, the plurality of left-eye G pixels, the plurality of left-eye B pixels, the plurality of right-eye R pixels, the plurality of right-eye G pixels, and the plurality of right-eye B pixels form a pixel array, which comprises a plurality of rows of pixels extending along the lateral direction of the display device 10 and a plurality of columns of pixels extending along the longitudinal direction of the display device 10. Each row of pixels comprises a plurality of left-eye R pixels, a plurality of left-eye G pixels, a plurality of left-eye B pixels, a plurality of right-eye R pixels, a plurality of right-eye G pixels, and a plurality of right-eye B pixels, and the left-eye R pixels, left-eye G pixels, left-eye B pixels, right-eye R pixels, right-eye G pixels, and right-eye B pixels are arranged alternately. For example, the arrangement may be in the order of a left-eye R pixel, a left-eye G pixel, a left-eye B pixel, a right-eye R pixel, a right-eye G pixel, and a right-eye B pixel, or the arrangement may be in the order of a left-eye R pixel, a right-eye R pixel, a left-eye G pixel, a right-eye G pixel, a left-eye B pixel, and a right-eye B pixel. In practical application, other alternating arrangements may be adopted, which are not limited herein. Each row of pixels comprises one of the left-eye R pixels, the left-eye G pixels, the left-eye B pixels, the right-eye R pixels, the right-eye G pixels, and the right-eye B pixels, and forms a row of the left-eye R pixels, a row of left-eye G pixels, a row of left-eye B pixels, a row of right-eye R pixels, a row of right-eye G pixels, or a row of right-eye B pixels.

When pixels in the display panel 20 are arranged in this way, the grating layer 30 may comprise a plurality of grating bulges 31, which are strip-shaped grating bulges 31. The grating bulges 31 extend along the lateral direction of the display device 10, and the grating bulges 31 are arranged in parallel along the longitudinal direction of the display device 10. In this case, the grating bulges 31 of the left-eye R grating region, the grating bulges 31 of the left-eye G grating region, the grating bulges 31 of the left-eye B grating region, the grating bulges 31 of the right-eye R grating region, the grating bulges 31 of the right-eye G grating region, and the grating bulges 31 of the right-eye B grating region are all strip-shaped grating bulges 31, and the grating bulges 31 extend along the lateral direction of the display device 10. The grating period of the left-eye R grating region, the grating period of the left-eye G grating region, the grating period of the left-eye B grating region, the grating period of the right-eye R grating region, the grating period of the right-eye G grating region, and the grating period of the right-eye B grating region can be set in the way of setting the grating layer 30 as described above.

In yet another way of arrangement of the pixels, along the lateral direction of the display device 10, the left-eye R pixels, left-eye G pixels, left-eye B pixels, right-eye R pixels, right-eye G pixels, and right-eye B pixels are arranged alternately; and along the longitudinal direction of the display device 10, the left-eye R pixels, left-eye G pixels, left-eye B pixels, right-eye R pixels, right-eye G pixels, and right-eye B pixels are arranged alternately.

Specifically, a plurality of left-eye R pixels, a plurality of left-eye G pixels, a plurality of left-eye B pixels, a plurality of right-eye R pixels, a plurality of right-eye G pixels, and a plurality of right-eye B pixels are arranged in an array, i.e. the plurality of left-eye R pixels, the plurality of left-eye G pixels, the plurality of left-eye B pixels, the plurality of right-eye R pixels, the plurality of right-eye G pixels, and the plurality of right-eye B pixels form a pixel array, which comprises a plurality of rows of pixels extending along the lateral direction of the display device 10 and a plurality of columns of pixels extending along the longitudinal direction of the display device 10. Each row of pixels comprises a plurality of left-eye R pixels, a plurality of left-eye G pixels, a plurality of left-eye B pixels, a plurality of right-eye R pixels, a plurality of right-eye G pixels, and a plurality of right-eye B pixels, and the left-eye R pixels, left-eye G pixels, left-eye B pixels, right-eye R pixels, right-eye G pixels, and right-eye B pixels are arranged alternately. For example, the arrangement may be in the order of a left-eye R pixel, a left-eye G pixel, a left-eye B pixel, a right-eye R pixel, a right-eye G pixel, and a right-eye B pixel, or the arrangement may be in the order of a left-eye R pixel, a right-eye R pixel, a left-eye G pixel, a right-eye G pixel, a left-eye B pixel, and a right-eye B pixel. In practical application, other alternating arrangements may be adopted, which are not limited herein. Each column of pixels comprises a plurality of left-eye R pixels, a plurality of left-eye G pixels, a plurality of left-eye B pixels, a plurality of right-eye R pixels, a plurality of right-eye G pixels, and a plurality of right-eye B pixels, and the left-eye R pixels, left-eye G pixels, left-eye B pixels, right-eye R pixels, right-eye G pixels, and right-eye B pixels are arranged alternately. For example, the arrangement may be in the order of a left-eye R pixel, a left-eye G pixel, a left-eye B pixel, a right-eye R pixel, a right-eye G pixel, and a right-eye B pixel, or the arrangement may be in the order of a left-eye R pixel, a right-eye R pixel, a left-eye G pixel, a right-eye G pixel, a left-eye B pixel, and a right-eye B pixel. In practical application, other alternating arrangements may be adopted, which are not limited herein.

In the above embodiment, when the viewer is in the viewing area in front of the display device 10 and is viewing an image displayed by the display device 10, the image viewed by the viewer seem to be projected on a virtual screen 40 behind the display device 10. The positional relation among the viewer, the display device 10 and the virtual screen 40 may vary.

Figure 8:
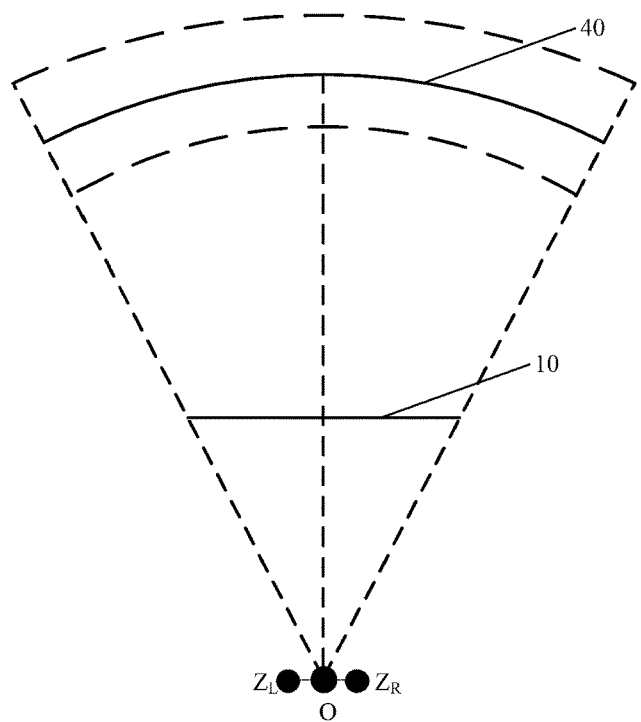
FIG. 8 schematically shows a positional relationship among a viewer, a display device and a virtual screen.

In one positional relation among the viewer, the display device 10 and the virtual screen 40, referring to FIG. 8, the viewer views the image displayed on the display device 10, the image is projected on the virtual screen 40 behind the display device 10, the virtual screen 40 is a curved-surface virtual screen and has a center O, and the viewer is at the center O of the virtual screen 40.

Figure 9:
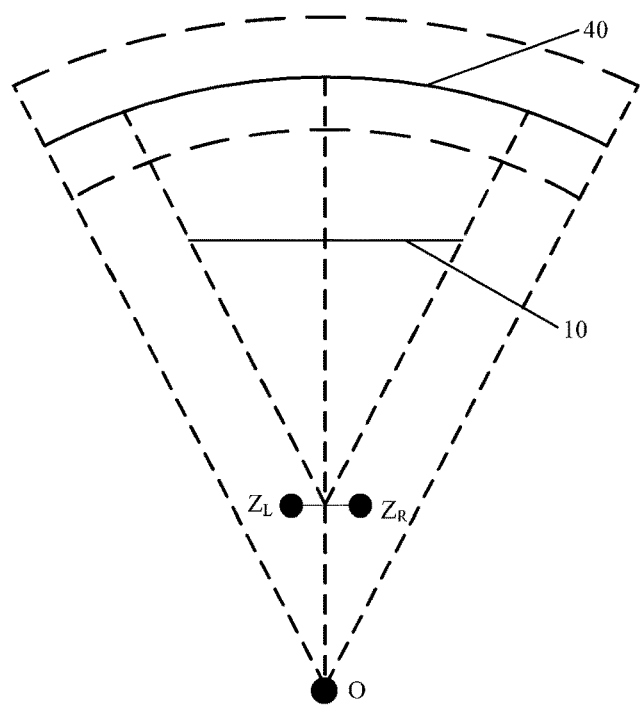
FIG. 9 schematically shows a positional relationship among a viewer, a display device and a virtual screen.

In another positional relation among the viewer, the display device 10 and the virtual screen 40, referring to FIG. 9, the viewer views the image displayed on the display device 10, the image is projected on the virtual screen 40 behind the display device 10, the virtual screen 40 is a curved-surface virtual screen and has a center O, and the viewer is at a side of the center O of the virtual screen 40 close to the virtual screen 40.

Figure 10:
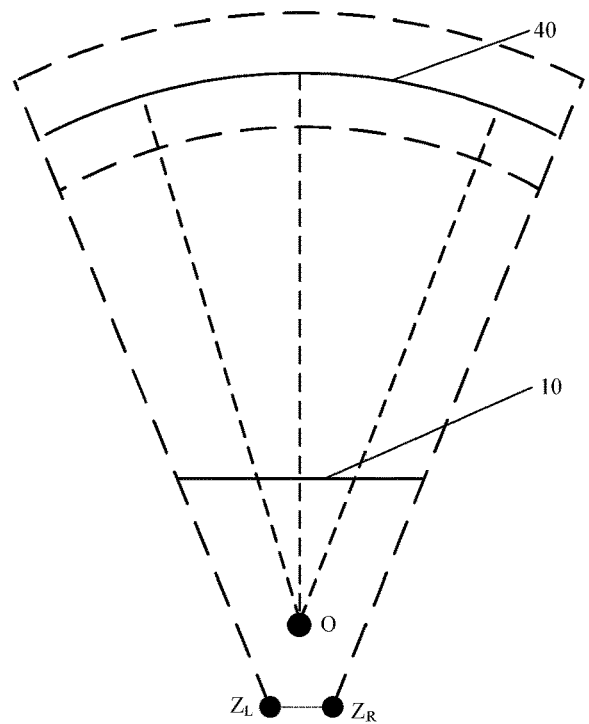
FIG. 10 schematically shows a positional relationship among a viewer, a display device and a virtual screen.

In yet another positional relation among the viewer, the display device 10 and the virtual screen 40, referring to FIG. 10, the viewer views an image displayed on the display device 10, the image is projected on the virtual screen 40 behind the display device 10, the virtual screen 40 is a curved-surface virtual screen and has a center O, the display device 10 is at a side of the center O of the virtual screen 40 close to the virtual screen 40, and the viewer is at a side of the center O of the virtual screen 40 away from the virtual screen 40.

It shall be noted that in the above three positional relations among the viewer, the display device 10 and the virtual screen 40, when the distance between the viewer and the display device 10 is constant, with respect to display devices 10 of the same size, the grating periods of individual positions on the display device 10 may adopt the same preset value if the position of the left-eye field-of-view central area $A_L$ and the position of the right-eye field-of-view central area $A_R$ are the same.

It shall be pointed out that in practical application, in the above embodiments, the arrangements of the grating layer 30, the ways of arrangement of the pixels and the positional relations among the viewer, the display device 10 and the virtual screen 40 can be combined freely to meet different application requirements for the display device 10, thereby realizing virtual display of the display device 10, for example, curved-surface 3D display, spherical 3D display, etc.

During practical application, light emitted from the left-eye field-of-view central area $A_L$ of the display device 10 can usually directly enter into the left eye of the viewer, so light emitted from the left-eye field-of-view central area $A_L$ of the display device 10 and falling into the left eye $Z_L$ of the viewer is usually the light of zero-order diffraction after passing through the grating layer 30. Light emitted from the non left-eye field-of-view central area of the display device 10 is deflected so as to be incident into the left eye of the viewer, so light emitted from the non left-eye field-of-view central area of the display device 10 and falling into the left eye $Z_L$ of the viewer is usually the light of non-zero-order diffraction (e.g. first-order diffraction) after passing through the grating layer 30. Thus light emitted from the left-eye field-of-view central area $A_L$ of the display device 10 and falling into the left eye $Z_L$ of the viewer may have a higher intensity than light emitted from the non left-eye field-of-view central area of the display device 10 and falling into the left eye $Z_L$ of the viewer. Similarly, light emitted from the right-eye field-of-view central area $A_R$ of the display device 10 can directly enter into the right eye of the viewer, so light emitted from the right-eye field-of-view central area $A_R$ of the display device 10 and falling into the right eye $Z_R$ of the viewer is usually the light of zero-order diffraction after passing through the grating layer 30. Light emitted from the non right-eye field-of-view central area of the display device 10 is deflected so as to be incident into the right eye of the viewer, so light emitted from the non right-eye field-of-view central area of the display device 10 and falling into the right eye $Z_R$ of the viewer is usually the light of non-zero-order diffraction (e.g. first-order diffraction) after passing through the grating layer 30. Thus light emitted from the right-eye field-of-view central area $A_R$ of the display device 10 and falling into the right eye $Z_R$ of the viewer may have a higher intensity than light emitted from the non right-eye field-of-view central area of the display device 10 and falling into the right eye $Z_R$ of the viewer. In order to further improve the on-the-spot effect of the display of the display device 10 and the immersion of the viewer, so as to improve the viewing experience of the viewer to bring more real and comfortable viewing experience to the viewer, it is necessary to increase the intensity of the light emitted from the non left-eye field-of-view central area of the display device 10 and falling into the left eye $Z_L$ of the viewer, such that intensities of light emitted from individual positions on the display device 10 and falling into the left eye $Z_L$ of the viewer match. Meanwhile, it is necessary to increase the intensity of the light emitted from the non right-eye field-of-view central area of the display device 10 and falling into the right eye $Z_R$ of the viewer, such that intensities of light emitted from individual positions on the display device 10 and falling into the right eye $Z_R$ of the viewer match.

The display device 10 of the embodiment of the present disclosure is provided with the grating layer 30, so the incident light incident on the grating layer 30 will be diffracted and interfered at the grating layer 30. The kth-order diffraction obtained by diffraction of the incident light at the grating layer 30 will have constructive interference or destructive interference, which is related to the thickness of the grating bulges 31 of the grating layer 30. Thus by setting the thickness of the grating bulges 31 of the grating layer 30, diffraction of a certain order may have constructive interference or destructive interference, thereby adjusting the intensity of the kth-order diffraction, and adjusting the intensity of light emitted from individual positions on the display device 10 and falling into the left eye $Z_L$ of the viewer, such that the amount and intensity of light rays emitted from individual positions on the display device 10 and falling into the left eye $Z_L$ of the viewer match; and adjusting the intensity of light emitted from individual positions on the display device 10 and falling into the right eye $Z_R$ of the viewer, such that the amount and intensity of light rays emitted from individual positions on the display device 10 and falling into the right eye $Z_R$ of the viewer match. As a result, the viewing experience of the viewer can be further improved to bring more real and comfortable viewing experience to the viewer.

Generally, when the grating period and the grating duty cycle of the grating layer 30 are fixed, a refractive index of a grating bulge 31 of the grating layer 30 is $n_G$, and a refractive index of a filler in a gap 32 between two adjacent grating bulges 31 is $n_S$, and the incident light incident on the grating layer 30 has a wavelength $\lambda$. When a thickness h of the grating layer 30 is $$h = \frac{m\lambda}{|n_G - n_S|},$$

and when m is a half-integer, the zero-order diffraction obtained by diffraction of the incident light at the grating layer 30 has a destructive interference, and the first-order diffraction obtained by diffraction of the incident light at the grating layer 30 has a constructive interference. When the thickness h of the grating layer 30 is $$h = \frac{m\lambda}{|n_G - n_S|},$$

and when m is an integer, the zero-order diffraction obtained by diffraction of the incident light at the grating layer 30 has a constructive interference, and the first-order diffraction obtained by diffraction of the incident light at the grating layer 30 has a destructive interference.

Figure 11:
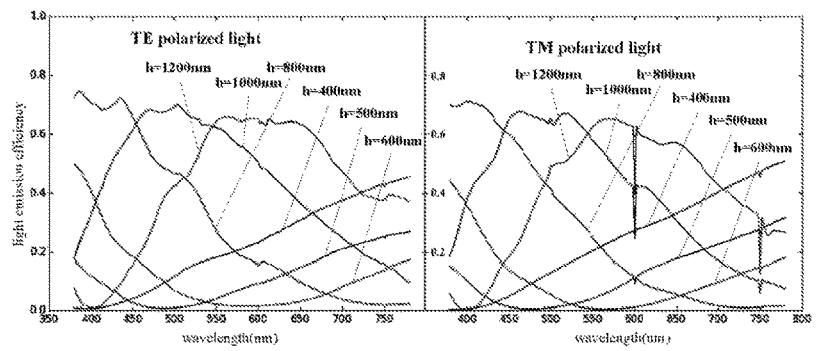
FIG. 11 schematically shows a diagram of relationship between light emission efficiency of a zero-order diffraction and a thickness of a grating bulge.
Figure 12:
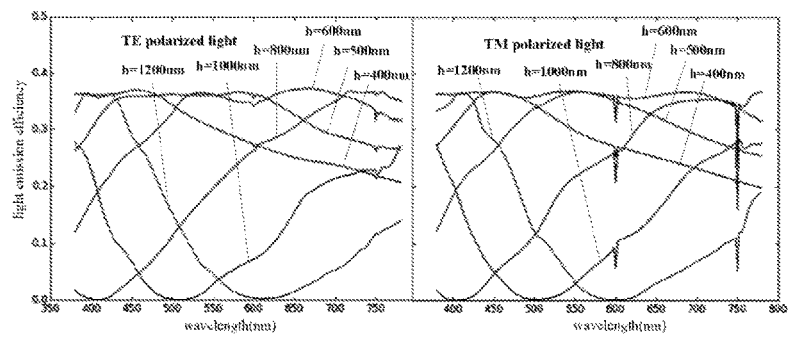
FIG. 12 schematically shows a diagram of relationship between light emission efficiency of a first-order diffraction and a thickness of a grating bulge.

For example, referring to FIGS. 11 and 12, when the grating period of the grating layer 30 is 3 μm, and the grating duty cycle of the grating layer 30 is 0.5, a relationship between the light emission efficiency of the zero-order diffraction obtained by diffraction, at the grating layer 30, of the incident light on the grating layer 30 and the thickness of the grating bulge 31 of the grating layer 30 is as shown in FIG. 11, and a relationship between the light emission efficiency of the first-order diffraction obtained by diffraction, at the grating layer 30, of the incident light on the grating layer 30 and the thickness of the grating bulge 31 of the grating layer 30 is as shown in FIG. 12. It can be seen from FIGS. 11 and 12 that, when m is an integer, e.g., when m is 1, the zero-order diffraction has constructive interference, and the first-order diffraction has destructive interference; when m is a half-integer, e.g. when m is ½, the zero-order diffraction has destructive interference, and the first-order diffraction has constructive interference.

In other words, the intensities of light emitted from individual positions of the display device 10 and falling into the left eye $Z_L$ of the viewer are related to the thicknesses of the grating bulges 31 of the grating layer 30, and the intensities of light emitted from individual positions of the display device 10 and falling into the right eye $Z_R$ of the viewer are related to the thicknesses of the grating bulges 31 of the grating layer 30. According to this conclusion, by setting the thicknesses of the grating bulges 31 on individual areas of the grating layer 30, the intensities of the zero-order diffraction and the non-zero-order diffraction on individual positions of the display device 10 can be adjusted, thus the intensity of the light emitted from individual positions on the display device 10 and falling into the left eye $Z_L$ of the viewer as well as the intensity of the light emitted from individual positions on the display device 10 and falling into the right eye $Z_R$ of the viewer can be adjusted. For example, the non-zero-order diffraction obtained by diffraction of the incident light in the area of the grating layer 30 corresponding to the non left-eye field-of-view central area is made to have a constructive interference, and the zero-order diffraction obtained by diffraction of the incident light in the area of the grating layer 30 corresponding to the left-eye field-of-view central area is made to have a destructive interference, so that intensities of light emitted from individual positions on the display device 10 and falling into the left eye $Z_L$ of the viewer match. Moreover, the non-zero-order diffraction obtained by diffraction of the incident light in the area of the grating layer 30 corresponding to the non right-eye field-of-view central area is made to have a constructive interference, and the zero-order diffraction obtained by diffraction of the incident light in the area of the grating layer 30 corresponding to the right-eye field-of-view central area is made to have a destructive interference, so that intensities of light emitted from individual positions on the display device 10 and falling into the right eye $Z_R$ of the viewer match.

In the embodiment of the present disclosure, control to both the zero-order diffraction and the first-order diffraction obtained by diffraction of the incident light at the grating layer 30 is described as an example. For the viewer, the light emitted from the left-eye field-of-view central area $A_L$ of the display device 10 can be considered as directly entering into the left eye of the viewer, while the light emitted from the non left-eye field-of-view central area of the display device 10 needs to be deflected so as to fall into the sight of the left eye $Z_L$ of the viewer. Therefore, in the left-eye field-of-view central area $A_L$ of the display device 10, the zero-order diffraction obtained by diffraction of the incident light at the grating layer 30 is mainly controlled, while in the non left-eye field-of-view central area of the display device 10, the first-order diffraction obtained by diffraction of the incident light at the grating layer 30 is mainly controlled. For the viewer, the light emitted from the right-eye field-of-view central area $A_R$ of the display device 10 can be considered as directly entering into the right eye of the viewer, while the light emitted from the non right-eye field-of-view central area of the display device 10 needs to be deflected so as to fall into the sight of the right eye $Z_R$ of the viewer. Therefore, in the right-eye field-of-view central area $A_R$ of the display device 10, the zero-order diffraction obtained by diffraction of the incident light at the grating layer 30 is mainly controlled, while in the non right-eye field-of-view central area of the display device 10, the first-order diffraction obtained by diffraction of the incident light at the grating layer 30 is mainly controlled.

Specifically, it is generally assumed that the incident light incident on the grating layer 30 is perpendicular to the grating layer 30, i.e. the incident light incident on the grating layer is in collimated incidence, and the incident angle $\theta_0$ of the incident light incident on the grating layer 30 is 0°. For example, when the display device 10 is a liquid crystal display device, the display device 10 comprises a display panel 20 and a back light source which provides area light source to the display panel 20. When an area light source is incident into the display panel 20, the incidence is usually perpendicular to the display panel 20, so when the grating layer 30 is arranged inside or outside of the display panel 20, the area light source is also incident perpendicular to the grating layer 30.

The grating layer 30 comprises a plurality of grating bulges 31, wherein a grating bulge 31 corresponding to the left-eye field-of-view central area $A_L$ has a thickness $h_{AL}$ that satisfies the formula of:

$$h_{AL} = \frac{m_{AL}\lambda}{|n_{GAL} - n_{SAL}|} \qquad (2)$$

wherein, $n_{GAL}$ is a refractive index of the grating bulge 31 corresponding to the left-eye field-of-view central area $A_L$, $n_{SAL}$ is a refractive index of a filler in a gap 32 between two adjacent grating bulges 31 corresponding to the left-eye field-of-view central area $A_L$, $\lambda$ is a wavelength of incident light incident on the grating layer 30, $m_{AL}$ is a first constant, which satisfies: $i_{AL}-½<m_{AL}<i_{AL}+½$, $i_{AL}=1, 2, 3, 4K$.

In formula (2), the first constant $m_{AL}$ satisfies $i_{AL}-½<m_{AL}<i_{AL}+½$, $i_{AL}=1, 2, 3, 4K$, i.e. the first constant $m_{AL}$ is not a half-integer. In this case, the first-order diffraction obtained by diffraction of the incident light in the area of the grating layer 30 corresponding to the left-eye field-of-view central area $A_L$ has a destructive interference, while the zero-order diffraction obtained by diffraction of the incident light in the area of the grating layer 30 corresponding to the left-eye field-of-view central area $A_L$ has no destructive interference. In other words, when the thickness $h_{AL}$ of the grating bulge 31 in the area corresponding to the left-eye field-of-view central area $A_L$ satisfies formula (2), the intensity of light emitted from the left-eye field-of-view central area $A_L$ of the display device 10 and falling into the left eye $Z_L$ of the viewer can be adjusted by adjusting the intensity of light of the zero-order diffraction obtained by diffraction of the incident light in the left-eye R grating region corresponding to the left-eye field-of-view central area $A_L$, adjusting the intensity of light of the zero-order diffraction obtained by diffraction of the incident light in the left-eye G grating region corresponding to the left-eye field-of-view central area $A_L$, and adjusting the intensity of light of the zero-order diffraction obtained by diffraction of the incident light in the left-eye B grating region corresponding to the left-eye field-of-view central area $A_L$, thereby improving brightness uniformity of the images viewed by the viewer, and improving viewing experience of the viewer to bring more real and comfortable viewing experience to the viewer.

The value of the first constant $m_{AL}$ can be an integer or a non-integer. The value of the first constant $m_{AL}$ can be chosen according to the actual need. For example, when there is only a small difference between the intensity of the zero-order diffraction obtained by diffraction of the incident light in the area of the grating layer 30 corresponding to the left-eye field-of-view central area $A_L$ and the intensity of the first-order diffraction obtained by diffraction of the incident light in the area of the grating layer 30 corresponding to the non left-eye field-of-view central area, the first constant $m_{AL}$ can be an integer. The zero-order diffraction obtained by diffraction of the incident light in the area of the grating layer 30 corresponding to the left-eye field-of-view central area $A_L$ has a constructive interference, and the intensity of the light of the zero-order diffraction obtained by diffraction of the incident light in the area of the grating layer 30 corresponding to the left-eye field-of-view central area $A_L$ reaches the maximum at this time. Alternatively, the first constant $m_{AL}$ can be a non-integer, and the value thereof is close to an integer. For example, when $i_{AL}=1$ and $0.5<m_{AL}<1$, the value of the first constant $m_{AL}$ can be 0.85, 0.9 or 0.95, etc.; when $i_{AL}=1$ and $1<m_{AL}<1.5$, the value of the first constant $m_{AL}$ can be 1.05, 1.1 or 1.15, etc.

When there is a big difference between the intensity of the zero-order diffraction obtained by diffraction of the incident light in the area of the grating layer 30 corresponding to the left-eye field-of-view central area $A_L$ and the intensity of the first-order diffraction obtained by diffraction of the incident light in the area of the grating layer 30 corresponding to the non left-eye field-of-view central area, the value of the first constant $m_{AL}$ may not be an integer, and the value of the first constant $m_{AL}$ is optionally close to a half-integer, i.e. the value of the first constant $m_{AL}$ satisfies: $i_{AL}-\frac{1}{2}<m_{AL}<i_{AL}$, $i_{AL}=1, 2, 3, 4K$, or $i_{AL}<m_{AL}<i_{AL}+\frac{1}{2}$, $i_{AL}=1, 2, 3, 4K$. For example, when $i_{AL}=1$ and $0.5<m_{AL}<1$, the value of the first constant $m_{AL}$ can be 0.55, 0.58 or 0.6, etc.; when $i_{AL}=1$ and $1<m_{AL}<1.5$, the value of the first constant $m_{AL}$ can be 1.4, 1.43 or 1.46, etc.

By setting the value of the first constant $m_{AL}$, the zero-order diffraction obtained by diffraction of the incident light in the area of the grating layer 30 corresponding to the left-eye field-of-view central area $A_L$ will not have complete constructive interference, so that the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer.

The grating bulge 31 corresponding to the non left-eye field-of-view central area has a thickness $h_{BL}$ that satisfies the formula of:

$$h_{BL} = \frac{m_{BL}\lambda}{|n_{GBL} - n_{SBL}|} \quad (3)$$

wherein, $n_{GBL}$ is a refractive index of the grating bulge 31 corresponding to the non left-eye field-of-view central area, $n_{SBL}$ is a refractive index of a filler in a gap 32 between two adjacent grating bulges 31 corresponding to the non left-eye field-of-view central area, $\lambda$ is a wavelength of incident light incident on the grating layer 30, $m_{BL}$ is a second constant, which satisfies: $m_{BL}=i_{BL}+\frac{1}{2}$, $i_{BL}=0, 1, 2, 3, 4K$.

When the thickness $h_{BL}$ of the grating bulge 31 in the area corresponding to the non left-eye field-of-view central area satisfies formula (3), the first-order diffraction obtained by diffraction of the incident light in the area of the grating layer 30 corresponding to the non left-eye field-of-view central area has a constructive interference, which increases the intensity of the first-order diffraction obtained by diffraction of the incident light in the left-eye R grating region corresponding to the non left-eye field-of-view central area, increases the intensity of the first-order diffraction obtained by diffraction of the incident light in the left-eye G grating region corresponding to the non left-eye field-of-view central area, and increases the intensity of the first-order diffraction obtained by diffraction of the incident light in the left-eye B grating region corresponding to the non left-eye field-of-view central area, thereby increasing the intensity of the first-order diffraction obtained by diffraction of the incident light in the area of the grating layer 30 corresponding to the non left-eye field-of-view central area, such that intensities of light emitted from individual positions on the display device 10 and falling into the left eye $Z_L$ of the viewer match, and brightness difference of the images viewed by the viewer is reduced, as a result, brightness uniformity of the images viewed by the viewer is improved and the viewing experience of the viewer is further improved to bring more real and comfortable viewing experience to the viewer.

The grating bulge 31 corresponding to the right-eye field-of-view central area $A_R$ has a thickness $h_{AR}$ that satisfies the formula of:

$$h_{AR} = \frac{m_{AR}\lambda}{|n_{GAR} - n_{SAR}|} \quad (4)$$

wherein, $n_{GAR}$ is a refractive index of the grating bulge 31 corresponding to the right-eye field-of-view central area $A_R$, $n_{SAR}$ is a refractive index of a filler in a gap 32 between two adjacent grating bulges 31 corresponding to the right-eye field-of-view central area $A_R$, $\lambda$ is a wavelength of incident light incident on the grating layer 30, $m_{AR}$ is a third constant, which satisfies: $i_{AR}-\frac{1}{2}<m_{AR}<i_{AR}+\frac{1}{2}$, $i_{AR}=1, 2, 3, 4K$.

In formula (4), the third constant $m_{AR}$ satisfies $i_{AR}-\frac{1}{2}<m_{AR}<i_{AR}+\frac{1}{2}$, $i_{AR}=1, 2, 3, 4K$, i.e. the first constant $m_{AR}$ is not a half-integer. In this case, the first-order diffraction obtained by diffraction of the incident light in the area of the grating layer 30 corresponding to the right-eye field-of-view central area $A_R$ has a destructive interference, while the zero-order diffraction obtained by diffraction of the incident light in the area of the grating layer 30 corresponding to the right-eye field-of-view central area $A_R$ does not have a destructive interference. In other words, when the thickness $h_{AR}$ of the grating bulge 31 in the area corresponding to the right-eye field-of-view central area $A_R$ satisfies formula (4), the intensity of light emitted from the right-eye field-of-view central area $A_R$ of the display device 10 and falling into the right eye $Z_R$ of the viewer can be adjusted by adjusting the intensity of light of the zero-order diffraction obtained by diffraction of the incident light in the right-eye R grating region corresponding to the right-eye field-of-view central area $A_R$, adjusting the intensity of light of the zero-order diffraction obtained by diffraction of the incident light in the right-eye G grating region corresponding to the right-eye field-of-view central area $A_R$, and adjusting the intensity of light of the zero-order diffraction obtained by diffraction of the incident light in the right-eye B grating region corresponding to the right-eye field-of-view central area $A_R$, thereby improving brightness uniformity of the images viewed by the viewer, and improving viewing experience of the viewer to bring more real and comfortable viewing experience to the viewer.

The value of the third constant $m_{AR}$ can be an integer or a non-integer. The value of the third constant $m_{AR}$ can be chosen according to the actual need. For example, when there is only a small difference between the intensity of the zero-order diffraction obtained by diffraction of the incident light in the area of the grating layer 30 corresponding to the right-eye field-of-view central area $A_R$ and the intensity of the first-order diffraction obtained by diffraction of the incident light in the area of the grating layer 30 corresponding to the non right-eye field-of-view central area, the third constant $m_{AR}$ can be an integer. The zero-order diffraction obtained by diffraction of the incident light in the area of the grating layer 30 corresponding to the right-eye field-of-view central area $A_R$ has a constructive interference, and the intensity of the light of the zero-order diffraction obtained by diffraction of the incident light in the area of the grating layer 30 corresponding to the right-eye field-of-view central area $A_R$ reaches the maximum at this time. Alternatively, the third constant $m_{AR}$ can be a non-integer, and the value thereof is close to an integer. For example, when $i_{AR}=1$ and $0.5<m_{AR}<1$, the value of the third constant $m_{AR}$ can be 0.85, 0.9 or 0.95, etc.; when $i_{AR}=1$ and $1<m_{AR}<1.5$, the value of the third constant $m_{AR}$ can be 1.05, 1.1 or 1.15, etc.

When there is a big difference between the intensity of the zero-order diffraction obtained by diffraction of the incident light in the area of the grating layer 30 corresponding to the right-eye field-of-view central area $A_R$ and the intensity of the first-order diffraction obtained by diffraction of the incident light in the area of the grating layer 30 corresponding to the non right-eye field-of-view central area, the value of the third constant $m_{AR}$ may not be an integer, and the value of the third constant $m_{AR}$ is optionally close to a half-integer, i.e. the value of the third constant $m_{AR}$ satisfies: $i_{AR}-\frac{1}{2}<m_{AR}<i_{AR}$, $i_{AR}=1, 2, 3, 4K$, or $i_{AR}<m_{AR}<i_{AR}+\frac{1}{2}$, $i_{AR}=1, 2, 3, 4K$. For example, when $i_{AR}=1$ and $0.5<m_{AR}<1$, the value of the third constant $m_{AR}$ can be 0.55, 0.58 or 0.6, etc.; when $i_{AR}=1$ and $1<m_{AR}<1.5$, the value of the third constant $m_{AR}$ can be 1.4, 1.43 or 1.46, etc.

By setting the value of the third constant $m_{AR}$, the zero-order diffraction obtained by diffraction of the incident light in the area of the grating layer 30 corresponding to the right-eye field-of-view central area $A_R$ will not have complete constructive interference, so that the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer.

The grating bulge 31 corresponding to the non right-eye field-of-view central area has a thickness $h_{BR}$ that satisfies the formula of:

$$h_{BR} = \frac{m_{BR}\lambda}{|n_{GBR} - n_{SBR}|} \tag{5}$$

wherein, $n_{GBR}$ is a refractive index of the grating bulge 31 corresponding to the non right-eye field-of-view central area, $n_{SBR}$ is a refractive index of a filler in a gap 32 between two adjacent grating bulges 31 corresponding to the non right-eye field-of-view central area, $\lambda$ is a wavelength of incident light incident on the grating layer 30, $m_{BR}$ is a fourth constant, which satisfies: $m_{BR}=i_{BR}+\frac{1}{2}$, $i_{BR}=0, 1, 2, 3, 4K$.

When the thickness $h_{BR}$ of the grating bulge 31 in the area corresponding to the non right-eye field-of-view central area satisfies formula (5), the first-order diffraction obtained by diffraction of the incident light in the area of the grating layer 30 corresponding to the non right-eye field-of-view central area has a constructive interference, which increases the intensity of the first-order diffraction obtained by diffraction of the incident light in the right-eye R grating region corresponding to the non right-eye field-of-view central area, increases the intensity of the first-order diffraction obtained by diffraction of the incident light in the right-eye G grating region corresponding to the non right-eye field-of-view central area, and increases the intensity of the first-order diffraction obtained by diffraction of the incident light in the right-eye B grating region corresponding to the non right-eye field-of-view central area, thereby increasing the intensity of the first-order diffraction obtained by diffraction of the incident light in the area of the grating layer 30 corresponding to the non right-eye field-of-view central area, such that intensities of light emitted from individual positions on the display device 10 and falling into the right eye $Z_R$ of the viewer match, and brightness difference of the images viewed by the viewer is reduced, as a result, brightness uniformity of the images viewed by the viewer is improved and the viewing experience of the viewer is further improved to bring more real and comfortable viewing experience to the viewer.

In the above embodiment, the grating layer 30 comprises the R grating region, the G grating region and the B grating region. The R grating region comprises the left-eye R grating region corresponding to the left-eye R pixels and the right-eye R grating region corresponding to the right-eye R pixels. The G grating region comprises the left-eye G grating region corresponding to the left-eye G pixels and the right-eye G grating region corresponding to the right-eye G pixels. The B grating region comprises the left-eye B grating region corresponding to the left-eye B pixels and the right-eye B grating region corresponding to the right-eye B pixels.

When setting the thickness of the grating bulge 31 in the area of the left-eye R grating region corresponding to the left-eye field-of-view central area $A_L$, the thickness of the grating bulge 31 in the area of the left-eye R grating region corresponding to the non left-eye field-of-view central area, the thickness of the grating bulge 31 in the area of the right-eye R grating region corresponding to the right-eye field-of-view central area $A_R$, and the thickness of the grating bulge 31 in the area of the right-eye R grating region corresponding to the non right-eye field-of-view central area, the wavelength λ of the incident light incident on the grating layer 30 is the wavelength of red light, which is 630 nm.

When setting the thickness of the grating bulge 31 in the area of the left-eye G grating region corresponding to the left-eye field-of-view central area $A_L$, the thickness of the grating bulge 31 in the area of the left-eye G grating region corresponding to the non left-eye field-of-view central area, the thickness of the grating bulge 31 in the area of the right-eye G grating region corresponding to the right-eye field-of-view central area $A_R$, and the thickness of the grating bulge 31 in the area of the right-eye G grating region corresponding to the non right-eye field-of-view central area, the wavelength λ of the incident light incident on the grating layer 30 is the wavelength of green light, which is 550 nm.

When setting the thickness of the grating bulge 31 in the area of the left-eye B grating region corresponding to the left-eye field-of-view central area $A_L$, the thickness of the grating bulge 31 in the area of the left-eye B grating region corresponding to the non left-eye field-of-view central area, the thickness of the grating bulge 31 in the area of the right-eye B grating region corresponding to the right-eye field-of-view central area $A_R$, and the thickness of the grating bulge 31 in the area of the right-eye B grating region corresponding to the non right-eye field-of-view central area, the wavelength λ of the incident light incident on the grating layer 30 is the wavelength of blue light, which is 430 nm.

In the above embodiment, there is a difference between $n_{GAL}$ and $n_{SAL}$, and the values of $n_{GAL}$ and $n_{SAL}$ can be set according to the actual application. For example, the relationship between $n_{GAL}$ and $n_{SAL}$ can be $n_{GAL}<n_{SAL}$ or $n_{GAL}>n_{SAL}$. In the embodiment of the present disclosure, the relationship between $n_{GAL}$ and $n_{SAL}$ is $n_{GAL}>n_{SAL}$, for example, $n_{GAL}=1.5$, $n_{SAL}=1$. That is, the material forming the grating bulges 31 in the area corresponding to the left-eye field-of-view central area $A_L$ has a refractive index of 1.5, and the filler filled in the gap 32 between two adjacent grating bulges 31 in the area corresponding to the left-eye field-of-view central area $A_L$ has a refractive index of 1. When the grating layer 30 is external to the display panel 20, the filler between two adjacent grating bulges 31 in the area corresponding to the left-eye field-of-view central area $A_L$ can be air.

In the above embodiment, there is a difference between $n_{GBL}$ and $n_{SBL}$, and the values of $n_{GBL}$ and $n_{SBL}$ can be set according to the actual application. For example, the relationship between $n_{GBL}$ and $n_{SBL}$ can be $n_{GBL}<n_{SBL}$ or $n_{GBL}>n_{SBL}$. In the embodiment of the present disclosure, the relationship between $n_{GBL}$ and $n_{SBL}$ is $n_{GBL}>n_{SBL}$, for example, $n_{GBL}=1.5$, $n_{SBL}=1$. That is, the material forming the grating bulges 31 in the area corresponding to the non left-eye field-of-view central area has a refractive index of 1.5, and the filler filled in the gap 32 between two adjacent grating bulges 31 in the area corresponding to the non left-eye field-of-view central area has a refractive index of 1. When the grating layer 30 is external to the display panel 20, the filler between two adjacent grating bulges 31 in the area corresponding to the non left-eye field-of-view central area can be air.

In the above embodiment, there is a difference between $n_{GAR}$ and $n_{SAR}$, and the values of $n_{GAR}$ and $n_{SAR}$ can be set according to the actual application. For example, the relationship between $n_{GAR}$ and $n_{SAR}$ can be $n_{GAR}<n_{SAR}$ or $n_{GAR}>n_{SAR}$. In the embodiment of the present disclosure, the relationship between $n_{GAR}$ and $n_{SAR}$ is $n_{GAR}>n_{SAR}$, for example, $n_{GAR}=1.5$, $n_{SAR}=1$. That is, the material forming the grating bulges 31 in the area corresponding to the right-eye field-of-view central area $A_R$ has a refractive index of 1.5, and the filler filled in the gap 32 between two adjacent grating bulges 31 in the area corresponding to the right-eye field-of-view central area $A_R$ has a refractive index of 1. When the grating layer 30 is external to the display panel 20, the filler between two adjacent grating bulges 31 in the area corresponding to the right-eye field-of-view central area $A_R$ can be air.

In the above embodiment, there is a difference between $n_{GBR}$ and $n_{SBR}$, and the values of $n_{GBR}$ and $n_{SBR}$ can be set according to the actual application. For example, the relationship between $n_{GBR}$ and $n_{SBR}$ can be $n_{SBR}<n_{SBR}$ or $n_{GBR}>n_{SBR}$. In the embodiment of the present disclosure, the relationship between $n_{SBR}$ and $n_{SBR}$ is $n_{SBR}>n_{SBR}$, for example, $n_{SBR}=1.5$, $n_{SBR}=1$. That is, the material forming the grating bulges 31 in the area corresponding to the non right-eye field-of-view central area has a refractive index of 1.5, and the filler filled in the gap 32 between two adjacent grating bulges 31 in the area corresponding to the non right-eye field-of-view central area has a refractive index of 1. When the grating layer 30 is external to the display panel 20, the filler between two adjacent grating bulges 31 in the area corresponding to the non right-eye field-of-view central area can be air.

In formula (2), when the values of $n_{GAL}$, $n_{SAL}$ and) are determined, the larger the value of the first constant $m_{AL}$, the larger the thickness $h_{AL}$ of the grating bulge 31 in the area corresponding to the left-eye field-of-view central area $A_L$. When making a thicker grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the first constant $m_{AL}$ satisfies $0.5<m_{AL}<1.5$, and optionally satisfies $0.5<m_{AL}\leq1$ so as to reduce the thickness $h_{AL}$ of the grating bulge 31 in the area corresponding to the left-eye field-of-view central area $A_L$, thereby reducing the manufacturing cost of the display device 10 and facilitating a thin design of the display device 10.

In formula (3), when the values of $n_{GBL}$, $n_{SBL}$ and λ are determined, the larger the value of the second constant $m_{BL}$, the larger the thickness $h_{BL}$ of the grating bulge 31 in the area corresponding to the non left-eye field-of-view central area. When making a thicker grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the second constant $m_{BL}$ satisfies $m_{BL}=0.5$, so as to reduce the thickness $h_{BL}$ of the grating bulge 31 in the area corresponding to the non left-eye field-of-view central area, thereby reducing the manufacturing cost of the display device 10 and facilitating a thin design of the display device 10.

In formula (4), when the values of $n_{GAR}$, $n_{SAR}$ and λ are determined, the larger the value of the third constant $m_{AR}$, the larger the thickness $h_{AR}$ of the grating bulge 31 in the area corresponding to the right-eye field-of-view central area $A_R$. When making a thicker grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the third constant $m_{AR}$ satisfies $0.5<m_{AR}<1.5$, and optionally satisfies $0.5<m_{AR}\leq 1$ so as to reduce the thickness $h_{AR}$ of the grating bulge 31 in the area corresponding to the right-eye field-of-view central area $A_R$, thereby reducing the manufacturing cost of the display device 10 and facilitating a thin design of the display device 10.

In formula (5), when the values of $n_{GBR}$, $n_{SBR}$ and $\lambda$ are determined, the larger the value of the fourth constant $m_{BR}$, the larger the thickness $h_{BR}$ of the grating bulge 31 in the area corresponding to the non right-eye field-of-view central area. When making a thicker grating bulge 31, more processes and time are needed, so the display device 10 has a high manufacturing cost and cannot be designed thin. Thus in order to reduce the manufacturing cost of the display device 10 and to facilitate a thin design thereof, in an embodiment of the present disclosure, the fourth constant $m_{BR}$ satisfies $m_{BR}=0.5$, so as to reduce the thickness $h_{BR}$ of the grating bulge 31 in the area corresponding to the non right-eye field-of-view central area, thereby reducing the manufacturing cost of the display device 10 and facilitating a thin design of the display device 10.

When setting the thickness of the grating bulge 31 in the area of the left-eye R grating region corresponding to the left-eye field-of-view central area $A_L$, the wavelength 1, of the light incident on the grating layer 30 is the wavelength of red light, which is 630 nm. According to formula (2), when the first constant $m_{AL}$ satisfies $0.5<m_{AL}<1.5$, the thickness $h_{ALR}$ of the grating bulge 31 in the area of the left-eye R grating region corresponding to the left-eye field-of-view central area $A_L$ satisfies 315 nm$<h_{ALR}<$945 nm. In practical application, when a difference between the intensity of the zero-order diffraction obtained by diffraction of the incident light in the area of the left-eye R grating region corresponding to the left-eye field-of-view central area $A_L$ and the intensity of the first-order diffraction obtained by diffraction of the incident light in the area of the left-eye R grating region corresponding to the non left-eye field-of-view central area is small, the thickness $h_{ALR}$ of the grating bulge 31 in the area of the left-eye R grating region corresponding to the left-eye field-of-view central area $A_L$ can be 630 nm. Alternatively, the thickness $h_{ALR}$ of the grating bulge 31 in the area of the left-eye R grating region corresponding to the left-eye field-of-view central area $A_L$ can have a value close to 630 nm, for example, the thickness $h_{ALR}$ of the grating bulge 31 in the area of the left-eye R grating region corresponding to the left-eye field-of-view central area $A_L$ can be 550 nm, 580 nm, 600 nm, 650 nm or 680 nm, etc. When a difference between the intensity of the zero-order diffraction obtained by diffraction of the incident light in the area of the left-eye R grating region corresponding to the left-eye field-of-view central area $A_L$ and the intensity of the first-order diffraction obtained by diffraction of the incident light in the area of the left-eye R grating region corresponding to the non left-eye field-of-view central area is large, optionally, the thickness $h_{ALR}$ of the grating bulge 31 in the area of the left-eye R grating region corresponding to the left-eye field-of-view central area $A_L$ is close to 315 nm. For example, the thickness $h_{ALR}$ of the grating bulge 31 in the area of the left-eye R grating region corresponding to the left-eye field-of-view central area $A_L$ can be 330 nm, 370 nm or 440 nm, etc. Alternatively, the thickness $h_{ALR}$ of the grating bulge 31 in the area of the left-eye R grating region corresponding to the left-eye field-of-view central area $A_L$ can be close to 945 nm, for example, the thickness $h_{ALR}$ of the grating bulge 31 in the area of the left-eye R grating region corresponding to the left-eye field-of-view central area $A_L$ can be 850 nm, 900 nm or 930 nm, etc.

When setting the thickness of the grating bulge 31 in the area of the left-eye G grating region corresponding to the left-eye field-of-view central area $A_L$, the wavelength $\lambda$ of the light incident on the grating layer 30 is the wavelength of green light, which is 550 nm. According to formula (2), when the first constant $m_{AL}$ satisfies $0.5<m_{AL}<1.5$, the thickness $h_{ALG}$ of the grating bulge 31 in the area of the left-eye G grating region corresponding to the left-eye field-of-view central area $A_L$ satisfies 275 nm$<h_{ALG}<$825 nm. In practical application, when a difference between the intensity of the zero-order diffraction obtained by diffraction of the incident light in the area of the left-eye G grating region corresponding to the left-eye field-of-view central area $A_L$ and the intensity of the first-order diffraction obtained by diffraction of the incident light in the area of the left-eye G grating region corresponding to the non left-eye field-of-view central area is small, the thickness $h_{ALG}$ of the grating bulge 31 in the area of the left-eye G grating region corresponding to the left-eye field-of-view central area $A_L$ can be 550 nm. Alternatively, the thickness $h_{ALG}$ of the grating bulge 31 in the area of the left-eye G grating region corresponding to the left-eye field-of-view central area $A_L$ can have a value close to 550 nm, for example, the thickness $h_{ALG}$ of the grating bulge 31 in the area of the left-eye G grating region corresponding to the left-eye field-of-view central area $A_L$ can be 500 nm, 530 nm, 580 nm or 600 nm, etc. When a difference between the intensity of the zero-order diffraction obtained by diffraction of the incident light in the area of the left-eye G grating region corresponding to the left-eye field-of-view central area $A_L$ and the intensity of the first-order diffraction obtained by diffraction of the incident light in the area of the left-eye G grating region corresponding to the non left-eye field-of-view central area is large, optionally, the thickness $h_{ALG}$ of the grating bulge 31 in the area of the left-eye G grating region corresponding to the left-eye field-of-view central area $A_L$ is close to 275 nm. For example, the thickness $h_{ALG}$ of the grating bulge 31 in the area of the left-eye G grating region corresponding to the left-eye field-of-view central area $A_L$ can be 300 nm, 320 nm or 350 nm, etc. Alternatively, the thickness $h_{ALG}$ of the grating bulge 31 in the area of the left-eye G grating region corresponding to the left-eye field-of-view central area $A_L$ can be close to 825 nm, for example, the thickness $h_{ALG}$ of the grating bulge 31 in the area of the left-eye G grating region corresponding to the left-eye field-of-view central area $A_L$ can be 800 nm, 760 nm or 730 nm, etc.

When setting the thickness of the grating bulge 31 in the area of the left-eye B grating region corresponding to the left-eye field-of-view central area $A_L$, the wavelength $\lambda$ of the light incident on the grating layer 30 is the wavelength of blue light, which is 430 nm. According to formula (2), when the first constant $m_{AL}$ satisfies $0.5<m_{AL}<1.5$, the thickness $h_{ALB}$ of the grating bulge 31 in the area of the left-eye B grating region corresponding to the left-eye field-of-view central area $A_L$ satisfies 215 nm$<h_{ALB}<$645 nm. In practical application, when a difference between the intensity of the zero-order diffraction obtained by diffraction of the incident light in the area of the left-eye B grating region corresponding to the left-eye field-of-view central area $A_L$ and the intensity of the first-order diffraction obtained by diffraction of the incident light in the area of the left-eye B grating region corresponding to the non left-eye field-of-view central area is small, the thickness $h_{ALB}$ of the grating bulge 31 in the area of the left-eye B grating region corresponding to the left-eye field-of-view central area $A_L$ can be 430 nm. Alternatively, the thickness $h_{ALB}$ of the grating bulge 31 in the area of the left-eye B grating region corresponding to the left-eye field-of-view central area $A_L$ can have a value close to 430 nm, for example, the thickness $h_{ALB}$ of the grating bulge 31 in the area of the left-eye B grating region corresponding to the left-eye field-of-view central area $A_L$ can be 350 nm, 380 nm, 480 nm or 500 nm, etc. When a difference between the intensity of the zero-order diffraction obtained by diffraction of the incident light in the area of the left-eye B grating region corresponding to the left-eye field-of-view central area $A_L$ and the intensity of the first-order diffraction obtained by diffraction of the incident light in the area of the left-eye B grating region corresponding to the non left-eye field-of-view central area is large, optionally, the thickness $h_{ALB}$ of the grating bulge 31 in the area of the left-eye B grating region corresponding to the left-eye field-of-view central area $A_L$ is close to 215 nm. For example, the thickness $h_{ALB}$ of the grating bulge 31 in the area of the left-eye B grating region corresponding to the left-eye field-of-view central area $A_L$ can be 250 nm, 280 nm or 300 nm, etc. Alternatively, the thickness $h_{ALB}$ of the grating bulge 31 in the area of the left-eye B grating region corresponding to the left-eye field-of-view central area $A_L$ is close to 645 nm, for example, the thickness $h_{ALB}$ of the grating bulge 31 in the area of the left-eye B grating region corresponding to the left-eye field-of-view central area $A_L$ can be 620 nm, 600 nm or 550 nm, etc.

When setting the thickness of the grating bulge 31 in the area of the left-eye R grating region corresponding to the non left-eye field-of-view central area, the wavelength λ of the light incident on the grating layer 30 is the wavelength of red light, which is 630 nm. According to formula (3), when the second constant $m_{BL}$ is 0.5, the thickness $h_{BLR}$ of the grating bulge 31 in the area of the left-eye R grating region corresponding to the non left-eye field-of-view central area is 630 nm. When setting the thickness of the grating bulge 31 in the area of the left-eye G grating region corresponding to the non left-eye field-of-view central area, the wavelength λ of the light incident on the grating layer 30 is the wavelength of green light, which is 550 nm. According to formula (3), when the second constant $m_{BL}$ is 0.5, the thickness $h_{BLG}$ of the grating bulge 31 in the area of the left-eye G grating region corresponding to the non left-eye field-of-view central area is 630 nm. When setting the thickness of the grating bulge 31 in the area of the left-eye B grating region corresponding to the non left-eye field-of-view central area, the wavelength λ of the light incident on the grating layer 30 is the wavelength of blue light, which is 430 nm. According to formula (3), when the second constant $m_{BL}$ is 0.5, the thickness $h_{BLB}$ of the grating bulge 31 in the area of the left-eye B grating region corresponding to the non left-eye field-of-view central area is 430 nm.

When setting the thickness of the grating bulge 31 in the area of the right-eye R grating region corresponding to the right-eye field-of-view central area $A_R$, the wavelength λ of the light incident on the grating layer 30 is the wavelength of red light, which is 630 nm. According to formula (4), when the third constant $m_{AR}$ satisfies $0.5<m_{AR}<1.5$, the thickness $h_{ARR}$ of the grating bulge 31 in the area of the right-eye R grating region corresponding to the right-eye field-of-view central area $A_R$ satisfies 315 nm<h<945 nm. In practical application, when a difference between the intensity of the zero-order diffraction obtained by diffraction of the incident light in the area of the right-eye R grating region corresponding to the right-eye field-of-view central area $A_R$ and the intensity of the first-order diffraction obtained by diffraction of the incident light in the area of the right-eye R grating region corresponding to the non right-eye field-of-view central area is small, the thickness $h_{ARR}$ of the grating bulge 31 in the area of the right-eye R grating region corresponding to the right-eye field-of-view central area $A_R$ can be 630 nm. Alternatively, the thickness $h_{ARR}$ of the grating bulge 31 in the area of the right-eye R grating region corresponding to the right-eye field-of-view central area $A_R$ can have a value close to 630 nm, for example, the thickness $h_{ARR}$ of the grating bulge 31 in the area of the right-eye R grating region corresponding to the right-eye field-of-view central area $A_R$ can be 550 nm, 580 nm, 600 nm, 650 nm or 680 nm, etc. When a difference between the intensity of the zero-order diffraction obtained by diffraction of the incident light in the area of the right-eye R grating region corresponding to the right-eye field-of-view central area $A_R$ and the intensity of the first-order diffraction obtained by diffraction of the incident light in the area of the right-eye R grating region corresponding to the non right-eye field-of-view central area is large, optionally, the thickness $h_{ARR}$ of the grating bulge 31 in the area of the right-eye R grating region corresponding to the right-eye field-of-view central area $A_R$ is close to 315 nm. For example, the thickness $h_{ARR}$ of the grating bulge 31 in the area of the right-eye R grating region corresponding to the right-eye field-of-view central area $A_R$ can be 330 nm, 370 nm or 440 nm, etc. Alternatively, the thickness $h_{ARR}$ of the grating bulge 31 in the area of the right-eye R grating region corresponding to the right-eye field-of-view central area $A_R$ can be close to 945 nm, for example, the thickness $h_{ARR}$ of the grating bulge 31 in the area of the right-eye R grating region corresponding to the right-eye field-of-view central area $A_R$ can be 850 nm, 900 nm or 930 nm, etc.

When setting the thickness of the grating bulge 31 in the area of the right-eye G grating region corresponding to the right-eye field-of-view central area $A_R$, the wavelength λ of the light incident into the grating layer 30 is the wavelength of green light, which is 550 nm. According to formula (4), when the third constant $m_{AR}$ satisfies $0.5<m_{AR}<1.5$, the thickness $h_{ARG}$ of the grating bulge 31 in the area of the right-eye G grating region corresponding to the right-eye field-of-view central area $A_R$ satisfies 275 nm<$h_{ARG}$<825 nm. In practical application, when a difference between the intensity of the zero-order diffraction obtained by diffraction of the incident light in the area of the right-eye G grating region corresponding to the right-eye field-of-view central area $A_R$ and the intensity of the first-order diffraction obtained by diffraction of the incident light in the area of the right-eye G grating region corresponding to the non right-eye field-of-view central area is small, the thickness $h_{ARG}$ of the grating bulge 31 in the area of the right-eye G grating region corresponding to the right-eye field-of-view central area $A_R$ can be 550 nm. Alternatively, the thickness $h_{ARG}$ of the grating bulge 31 in the area of the right-eye G grating region corresponding to the right-eye field-of-view central area $A_R$ can have a value close to 550 nm, for example, the thickness $h_{ARG}$ of the grating bulge 31 in the area of the right-eye G grating region corresponding to the right-eye field-of-view central area $A_R$ can be 500 nm, 530 nm, 580 nm or 600 nm, etc. When a difference between the intensity of the zero-order diffraction obtained by diffraction of the incident light in the area of the right-eye G grating region corresponding to the right-eye field-of-view central area $A_R$ and the intensity of the first-order diffraction obtained by diffraction of the incident light in the area of the right-eye G grating region corresponding to the non right-eye field-of-view central area is large, optionally, the thickness $h_{ARG}$ of the grating bulge 31 in the area of the right-eye G grating region corresponding to the right-eye field-of-view central area $A_R$ is close to 275 nm. For example, the thickness $h_{ARG}$ of the grating bulge 31 in the area of the right-eye G grating region corresponding to the right-eye field-of-view central area $A_R$ can be 300 nm, 320 nm or 350 nm, etc. Alternatively, the thickness $h_{ARG}$ of the grating bulge 31 in the area of the right-eye G grating region corresponding to the right-eye field-of-view central area $A_R$ is close to 825 nm, for example, the thickness $h_{ARG}$ of the grating bulge 31 in the area of the right-eye G grating region corresponding to the right-eye field-of-view central area $A_R$ can be 800 nm, 760 nm or 730 nm, etc.

When setting the thickness of the grating bulge 31 in the area of the right-eye B grating region corresponding to the right-eye field-of-view central area $A_R$, the wavelength λ of the light incident on the grating layer 30 is the wavelength of blue light, which is 430 nm. According to formula (4), when the third constant $m_{AR}$ satisfies $0.5<m_{AR}<1.5$, the thickness $h_{ARB}$ of the grating bulge 31 in the area of the right-eye B grating region corresponding to the right-eye field-of-view central area $A_R$ satisfies 215 nm<$h_{ARB}$<645 nm. In practical application, when a difference between the intensity of the zero-order diffraction obtained by diffraction of the incident light in the area of the right-eye B grating region corresponding to the right-eye field-of-view central area $A_R$ and the intensity of the first-order diffraction obtained by diffraction of the incident light in the area of the right-eye B grating region corresponding to the non right-eye field-of-view central area is small, the thickness $h_{ARB}$ of the grating bulge 31 in the area of the right-eye B grating region corresponding to the right-eye field-of-view central area $A_R$ can be 430 nm. Alternatively, the thickness $h_{ARB}$ of the grating bulge 31 in the area of the right-eye B grating region corresponding to the right-eye field-of-view central area $A_R$ can have a value close to 430 nm, for example, the thickness $h_{ARB}$ of the grating bulge 31 in the area of the right-eye B grating region corresponding to the right-eye field-of-view central area $A_R$ can be 350 nm, 380 nm, 480 nm or 500 nm, etc. When a difference between the intensity of the zero-order diffraction obtained by diffraction of the incident light in the area of the right-eye B grating region corresponding to the right-eye field-of-view central area $A_R$ and the intensity of the first-order diffraction obtained by diffraction of the incident light in the area of the right-eye B grating region corresponding to the non right-eye field-of-view central area is large, optionally, the thickness $h_{ARB}$ of the grating bulge 31 in the area of the right-eye B grating region corresponding to the right-eye field-of-view central area $A_R$ is close to 215 nm. For example, the thickness $h_{ARB}$ of the grating bulge 31 in the area of the right-eye B grating region corresponding to the right-eye field-of-view central area $A_R$ can be 250 nm, 280 nm or 300 nm, etc. Alternatively, the thickness $h_{ARB}$ of the grating bulge 31 in the area of the right-eye B grating region corresponding to the right-eye field-of-view central area $A_R$ is close to 645 nm, for example, the thickness $h_{ARB}$ of the grating bulge 31 in the area of the right-eye B grating region corresponding to the right-eye field-of-view central area $A_R$ can be 620 nm, 600 nm or 550 nm, etc.

When setting the thickness of the grating bulge 31 in the area of the right-eye R grating region corresponding to the non right-eye field-of-view central area, the wavelength λ of the light incident on the grating layer 30 is the wavelength of red light, which is 630 nm. According to formula (5), when the fourth constant $m_{BR}$ is 0.5, the thickness $h_{BRR}$ of the grating bulge 31 in the area of the right-eye R grating region corresponding to the non right-eye field-of-view central area is 630. When setting the thickness of the grating bulge 31 in the area of the right-eye G grating region corresponding to the non right-eye field-of-view central area, the wavelength λ of the light incident on the grating layer 30 is the wavelength of green light, which is 550 nm. According to formula (5), when the fourth constant $m_{BR}$ is 0.5, the thickness $h_{BRG}$ of the grating bulge 31 in the area of the right-eye G grating region corresponding to the non right-eye field-of-view central area is 630 nm. When setting the thickness of the grating bulge 31 in the area of the right-eye B grating region corresponding to the non right-eye field-of-view central area, the wavelength λ of the light incident on the grating layer 30 is the wavelength of blue light, which is 430 nm. According to formula (5), when the fourth constant $m_{BR}$ is 0.5, the thickness $h_{BRB}$ of the grating bulge 31 in the area of the right-eye B grating region corresponding to the non right-eye field-of-view central area is 430 nm.

Figure 13:
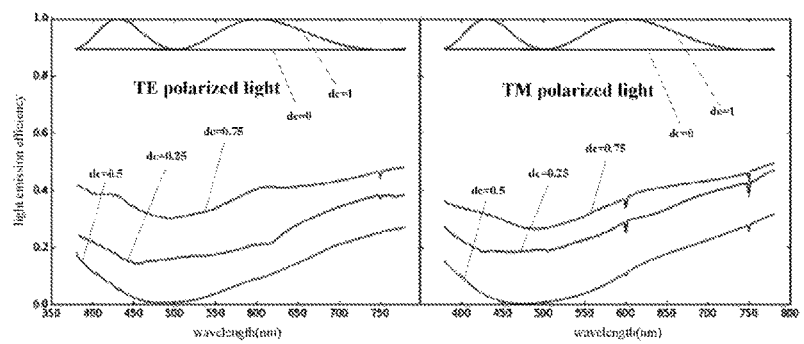
FIG. 13 schematically shows a diagram of relationship between light emission efficiency of a zero-order diffraction and a grating duty cycle.
Figure 14:
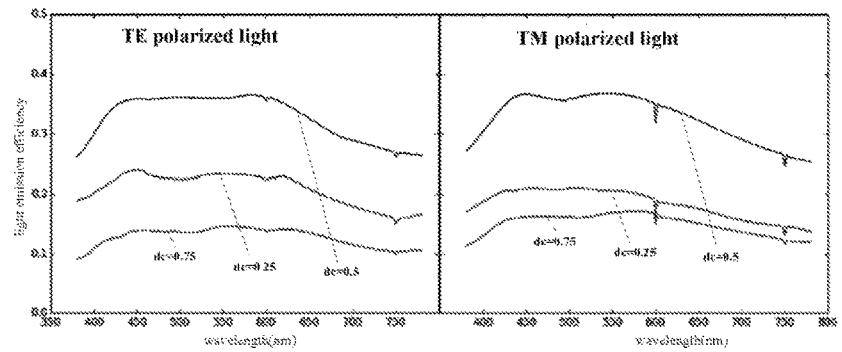
FIG. 14 schematically shows a diagram of relationship between light emission efficiency of a first-order diffraction and a grating duty cycle.

In practical application, referring to FIGS. 13 and 14, when the grating period of the grating layer 30 is 3 μm and the thickness of the grating bulges 31 of the grating layer 30 is 500 nm, a relationship between the light emission efficiency of the zero-order diffraction obtained by the incident light incident on the grating layer 30 being diffracted at the grating layer 30 and the grating duty cycle is as shown in FIG. 13, and a relationship between the light emission efficiency of the first-order diffraction obtained by the incident light incident on the grating layer 30 being diffracted at the grating layer 30 and the grating duty cycle is as shown in FIG. 14. It can be seen from FIG. 13 that as for the zero-order diffraction, when the grating duty cycle is 0.5, the zero-order diffraction has the smallest intensity, when the grating duty cycle is smaller than 0.5, the intensity of the zero-order diffraction decreases as the grating duty cycle increases, and when the grating duty cycle is greater than 0.5, the intensity of the zero-order diffraction increases as the grating duty cycle increases. It can be seen from FIG. 14 that as for the first-order diffraction, when the grating duty cycle is 0.5, the first-order diffraction has the largest intensity, when the grating duty cycle is smaller than 0.5, the intensity of the first-order diffraction increases as the grating duty cycle increases, and when the grating duty cycle is greater than 0.5, the intensity of the first-order diffraction decreases as the grating duty cycle increases.

In other words, the intensities of light emitted from individual positions on the display device 10 are also related to the grating duty cycle of the grating layer 30. According to this conclusion, by setting the grating duty cycle of the grating layer 30, the intensity of the non-zero-order diffraction obtained by diffraction of the incident light in the area of the grating layer 30 corresponding to the non left-eye field-of-view central area can be increased, and accordingly, the intensity of the light emitted from the non left-eye field-of-view central area of the display device 10 and falling into the left eye $Z_L$ of the viewer can be increased, and when necessary, the intensity of the zero-order diffraction obtained by diffraction of the incident light in the area of the grating layer 30 corresponding to the left-eye field-of-view central area $A_L$ can be decreased properly, so as to reduce the intensity of the light emitted from the left-eye field-of-view central area $A_L$ of the display device 10 and falling into the left eye $Z_L$ of the viewer properly. As a result, the intensity of light emitted from the non left-eye field-of-view central area of the display device 10 and falling into the left eye $Z_L$ of the viewer is made to match the intensity of light emitted from the left-eye field-of-view central area $A_L$ of the display device 10 and falling into the left eye $Z_L$ of the viewer.

By setting the grating duty cycle of the grating layer 30, the intensity of the non-zero-order diffraction obtained by diffraction of the incident light in the area of the grating layer 30 corresponding to the non right-eye field-of-view central area can be increased, and accordingly, the intensity of the light emitted from the non right-eye field-of-view central area of the display device 10 and falling into the right eye $Z_R$ of the viewer can be increased, and when necessary, the intensity of the zero-order diffraction obtained by diffraction of the incident light in the area of the grating layer 30 corresponding to the right-eye field-of-view central area $A_R$ can be decreased properly, so as to reduce the intensity of the light emitted from the right-eye field-of-view central area $A_R$ of the display device 10 and falling into the right eye $Z_R$ of the viewer properly. As a result, the intensity of light emitted from the non right-eye field-of-view central area of the display device 10 and falling into the right eye $Z_R$ of the viewer is made to match the intensity of light emitted from the right-eye field-of-view central area $A_R$ of the display device 10 and falling into the right eye $Z_R$ of the viewer.

Specifically, in the area corresponding to the left-eye field-of-view central area $A_L$, the grating duty cycle $dc_{AL}$ of the grating layer 30 satisfies $0.2 \le dc_{AL}$ 0.8. In the area corresponding to the non left-eye field-of-view central area, the grating duty cycle $dc_{BL}$ of the grating layer 30 is 0.5. In the area corresponding to the right-eye field-of-view central area $A_R$, the grating duty cycle $dc_{AR}$ of the grating layer 30 satisfies $0.2 \le dc_{AR} \le 0.8$; in the area corresponding to the non right-eye field-of-view central area, the grating duty cycle $dc_{BR}$ of the grating layer 30 is 0.5.

In an embodiment of the present disclosure, in the area of the grating layer 30 corresponding to the non left-eye field-of-view central area, the grating duty cycle $dc_{BL}$ of the grating layer 30 is set as 0.5. Thus in the area corresponding to the non left-eye field-of-view central area, when the grating period of the grating layer 30 and the thickness of the grating bulge 31 of the grating layer 30 are fixed, the first-order diffraction obtained by diffraction of the incident light in the area of the grating layer 30 corresponding to the non left-eye field-of-view central area has the largest intensity, so that light emitted from the non left-eye field-of-view central area of the display device 10 and falling into the left eye $Z_L$ of the viewer has a stronger intensity. As a result, the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer.

In an embodiment of the present disclosure, in the area corresponding to the left-eye field-of-view central area $A_L$, the grating duty cycle $dc_{AL}$ of the grating layer 30 satisfies $0.2 \le dc_{AL} \le 0.8$. In practical application, in the area corresponding to the left-eye field-of-view central area $A_L$, the grating duty cycle $dc_{AL}$ of the grating layer 30 can be set according to the actual need. For example, when there is a big difference between the intensity of light emitted from the non left-eye field-of-view central area of the display device 10 and falling into the left eye $Z_L$ of the viewer, and the intensity of light emitted from the left-eye field-of-view central area $A_L$ of the display device 10 and falling into the left eye $Z_L$ of the viewer, the value of the grating duty cycle $dc_{AL}$ of the grating layer 30 can be set as 0.5 in the area corresponding to the left-eye field-of-view central area $A_L$. In this case, in the area corresponding to the left-eye field-of-view central area $A_L$, when the grating period of the grating layer 30 and the thickness of the grating bulge 31 of the grating layer 30 are fixed, the zero-order diffraction obtained by diffraction of the incident light in the area of the grating layer 30 corresponding to the left-eye field-of-view central area $A_L$ has the smallest intensity, so that the intensity of the zero-order diffraction obtained by diffraction of the incident light in the area of the grating layer 30 corresponding to the left-eye field-of-view central area $A_L$ can be decreased properly. As a result, the intensity of light emitted from the non left-eye field-of-view central area of the display device 10 and falling into the left eye $Z_L$ of the viewer matches the intensity of light emitted from the left-eye field-of-view central area $A_L$ of the display device 10 and falling into the left eye $Z_L$ of the viewer. When there is a small difference between the intensity of light emitted from the non left-eye field-of-view central area of the display device 10 and falling into the left eye $Z_L$ of the viewer and the intensity of light emitted from the left-eye field-of-view central area $A_L$ of the display device 10 and falling into the left eye $Z_L$ of the viewer, the grating duty cycle $dc_{AL}$ of the grating layer 30 can be made to satisfy $0.2 \le dc_{AL} < 0.5$ or $0.5 < dc_{AL} \le 0.8$ in the area corresponding to the left-eye field-of-view central area $A_L$. For example, the value of the grating duty cycle $dc_{AL}$ of the grating layer 30 can be 0.2, 0.3, 0.4, 0.6, 0.7 or 0.8. In this case, in the area corresponding to the left-eye field-of-view central area $A_L$, when the grating period of the grating layer 30 and the thickness of the grating bulge 31 of the grating layer 30 are fixed, the intensity of the zero-order diffraction obtained by diffraction of the incident light in the area of the grating layer 30 corresponding to the left-eye field-of-view central area $A_L$ is not the smallest, and the intensity of the zero-order diffraction obtained by diffraction of the incident light in the area of the grating layer 30 corresponding to the left-eye field-of-view central area $A_L$ is not the strongest, either, such that the intensity of light emitted from the non left-eye field-of-view central area of the display 10 and falling into the left eye $Z_L$ of the viewer matches the intensity of light emitted from the left-eye field-of-view central area $A_L$ of the display device 10 and falling into the left eye $Z_L$ of the viewer.

In an embodiment of the present disclosure, in the area of the grating layer 30 corresponding to the non right-eye field-of-view central area, the grating duty cycle $dc_{BR}$ of the grating layer 30 is set as 0.5, thus in the area corresponding to the non right-eye field-of-view central area, when the grating period of the grating layer 30 and the thickness of the grating bulge 31 of the grating layer 30 are fixed, the first-order diffraction obtained by diffraction of the incident light in the area of the grating layer 30 corresponding to the non right-eye field-of-view central area has the strongest intensity, so that light emitted from the non right-eye field-of-view central area of the display device 10 and falling into the right eye $Z_R$ of the viewer has a stronger intensity. As a result, the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer.

In an embodiment of the present disclosure, in the area corresponding to the right-eye field-of-view central area $A_R$, the grating duty cycle $dc_{AR}$ of the grating layer 30 satisfies $0.2 \le dc_{AR} \le 0.8$. In practical application, in the area corresponding to the right-eye field-of-view central area $A_R$, the grating duty cycle $dc_{AR}$ of the grating layer 30 can be set according to the actual need. For example, when there is a big difference between the intensity of light emitted from the non right-eye field-of-view central area of the display device 10 and falling into the right eye $Z_R$ of the viewer and the intensity of light emitted from the right-eye field-of-view central area $A_R$ of the display device 10 and falling into the right eye $Z_R$ of the viewer, the value of the grating duty cycle $dc_{AR}$ of the grating layer 30 can be set as 0.5 in the area corresponding to the right-eye field-of-view central area $A_R$. In this case, in the area corresponding to the right-eye field-of-view central area $A_R$, when the grating period of the grating layer 30 and the thickness of the grating bulge 31 of the grating layer 30 are fixed, the zero-order diffraction obtained by diffraction of the incident light in the area of the grating layer 30 corresponding to the right-eye field-of-view central area $A_R$ has the smallest intensity, so that the intensity of the zero-order diffraction obtained by diffraction of the incident light in the area of the grating layer 30 corresponding to the right-eye field-of-view central area $A_R$ can be decreased properly. As a result, the intensity of light emitted from the non right-eye field-of-view central area of the display device 10 and falling into the right eye $Z_R$ of the viewer matches the intensity of light emitted from the right-eye field-of-view central area $A_R$ of the display device 10 and falling into the right eye $Z_R$ of the viewer. When there is a small difference the intensity of light emitted from the non right-eye field-of-view central area of the display device 10 and falling into the right eye $Z_R$ of the viewer and the intensity of light emitted from the right-eye field-of-view central area $A_R$ of the display device 10 and falling into the right eye $Z_R$ of the viewer, the grating duty cycle $dc_{AR}$ of the grating layer 30 can be made to satisfy $0.2 \leq dc_{AR} < 0.5$ or $0.5 < dc_{AR} \leq 0.8$ in the area corresponding to the right-eye field-of-view central area $A_R$. For example, the value of the grating duty cycle $dc_{AL}$ of the grating layer 30 can be 0.2, 0.3, 0.4, 0.6, 0.7 or 0.8. In this case, in the area corresponding to the right-eye field-of-view central area $A_R$, when the grating period of the grating layer 30 and the thickness of the grating bulge 31 of the grating layer 30 are fixed, the intensity of the zero-order diffraction obtained by diffraction of the incident light in the area of the grating layer 30 corresponding to the right-eye field-of-view central area $A_R$ is not the smallest, and the intensity of the zero-order diffraction obtained by diffraction of the incident light in the area of the grating layer 30 corresponding to the right-eye field-of-view central area $A_R$ is not the strongest, either, such that the intensity of light emitted from the non right-eye field-of-view central area of the display 10 and falling into the right eye $Z_R$ of the viewer matches the intensity of light emitted from the right-eye field-of-view central area $A_R$ of the display device 10 and falling into the right eye $Z_R$ of the viewer.

In the above embodiments, the grating bulges 31 can be either transparent grating bulges or non-transparent grating bulges, and there are many options for the materials of the grating bulges 31. In an exemplary embodiment of the present disclosure, the grating bulges 31 are transparent grating bulges and are polymethyl methacrylate grating bulges 31.

Referring to FIGS. 15-20, a cross-section shape of the grating bulge 31 can be a step shape, a trapezoidal shape, or a triangular shape.

Figure 15:
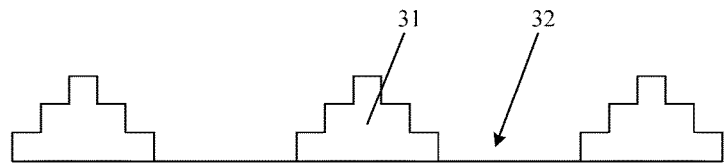
FIG. 15 schematically shows a sectional view of the grating bulge.
Figure 16:
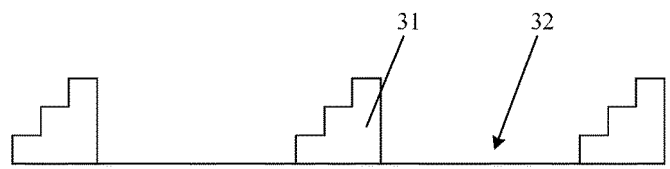
FIG. 16 schematically shows a sectional view of the grating bulge.

For example, referring to FIGS. 15-16, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained cross-section shape of the grating bulge 31 is a step shape. In practical application, as shown in FIG. 16, one side of the cross section of the grating bulge 31 can have a step shape, or as shown in FIG. 15, both sides of the cross section of the grating bulge 31 have a step shape. When both sides of the cross section of the grating bulge 31 have a step shape, the step shapes of both sides of the cross section of the grating bulge 31 can be symmetrical relative to a central line perpendicular to a light entrance surface of the grating bulge 31 on the cross section of the grating bulge 31, or the step shapes of both sides of the cross section of the grating bulge 31 can be asymmetrical relative to the central line perpendicular to a light entrance surface of the grating bulge 31 on the cross section of the grating bulge 31.

Figure 17:
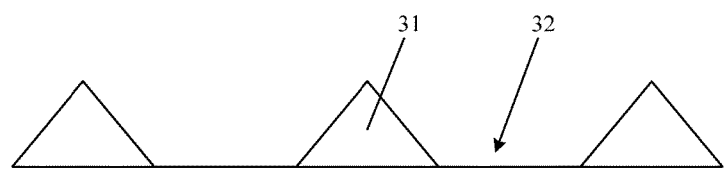
FIG. 17 schematically shows a sectional view of the grating bulge.
Figure 18:
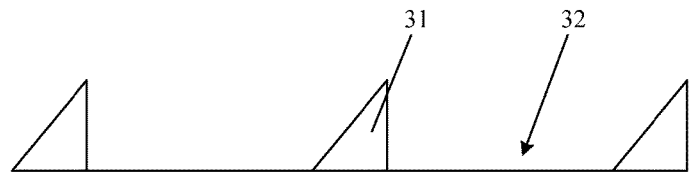
FIG. 18 schematically shows a sectional view of the grating bulge.

Referring to FIGS. 17 and 18, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained cross-section shape of the grating bulge 31 is a triangular shape. In practical application, as shown in FIG. 17, both sides of the cross section of the grating bulge 31 can be symmetrical relative to a central line perpendicular to a light entrance surface of the grating bulge 31 on the cross section of the grating bulge 31. In this case, the cross-section shape of the grating bulge 31 is an isosceles triangle. Alternatively, as shown in FIG. 18, both sides of the cross section of the grating bulge 31 can be asymmetrical relative to the central line perpendicular to a light entrance surface of the grating bulge 31 on the cross section of the grating bulge 31.

Figure 19:
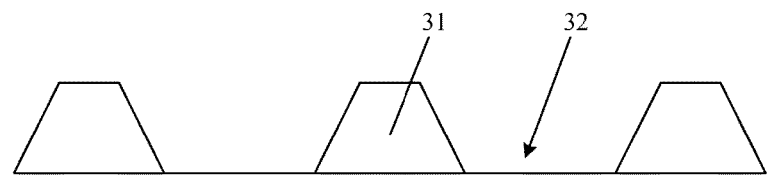
FIG. 19 schematically shows a sectional view of the grating bulge.
Figure 20:
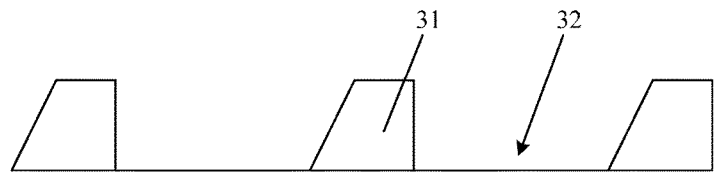
FIG. 20 schematically shows a sectional view of the grating bulge.

Referring to FIGS. 19 and 20, the grating layer 30 comprises a plurality of grating bulges 31, and there is a gap 32 between two adjacent grating bulges 31. When a grating bulge 31 is cut by a plane perpendicular to a direction of extension of the gap 32 between two adjacent grating bulges 31, the obtained cross-section shape of the grating bulge 31 is a trapezoidal shape. In practical application, as shown in FIG. 19, both sides of the cross section of the grating bulge 31 can be symmetrical relative to the central line perpendicular to the light entrance surface of the grating bulge 31 on the cross section of the grating bulge 31. In this case, the cross-section shape of the grating bulge 31 is an isosceles trapezoid. Alternatively, as shown in FIG. 20, both sides of the cross section of the grating bulge 31 can be asymmetrical relative to the central line perpendicular to the light entrance surface of the grating bulge 31 on the cross section of the grating bulge 31.

Since the cross section shape of the grating bulge 31 is a step shape, a trapezoidal shape, or a triangular shape, a light exiting surface of each grating bulge 31 is not parallel to the light entrance surface thereof. When light incident on the grating layer 30 passes through the grating layer 30, it is diffracted and interfered several times by the grating layer 30, thus the effects of diffraction and interference of the incident light on the grating layer 30 are enhanced, and the ability of adjusting the light exiting directions in individual positions on the display device 10 is enhanced. As a result, light propagation within the display device 10 can be better controlled and the effect of control to light propagation within the display device 10 can be improved, thereby improving the viewing experience of the viewer to bring more real and comfortable viewing experience to the viewer.

It shall be noted that when both sides of the cross section of the grating bulge 31 are asymmetrical relative to the central line of the cross section of the grating bulge 31, and when light incident on the grating layer 30 passes through the grating layer 30, the incident light is diffracted and interfered by the grating layer 30, and the diffraction angle and intensity of the obtained kth-order diffraction are asymmetrical relative to the zero-order diffraction. By making both sides of the cross section of the grating bulge 31 to be asymmetrical relative to the central line of the cross section of the grating bulge 31, the kth-order diffraction emitted away from the sight of the viewer is enabled to have a destructive interference, while the kth-order diffraction emitted towards the sight of the viewer is enabled to have a constructive interference, thereby further improving the effect of control to the light propagation within the display device 10, improving viewing experience of the viewer to bring more real and comfortable viewing experience to the viewer.

It shall be noted that although in the above embodiments, the concept of the present disclosure is described by taking the display device 10 with the color scheme of RGB (Red, Green, Blue) as an example, those skilled in the art shall appreciate that the concept of the present disclosure can be applied to display devices with other color schemes, e.g. a color scheme of RGBW (Red, Green, Blue, White).

Referring to FIG. 3, the display panel 20 comprises a color film layer 23, and the grating layer 30 is at a light exiting side or a light entrance side of the color film layer 23. For example, as shown in FIG. 3, the display panel 20 comprises a first substrate 21, a second substrate 22 and a color film layer 23, the first substrate 21 and the second substrate 22 being opposite to each other and the color film layer 23 being disposed between the first substrate 21 and the second substrate 22. In FIG. 3, the downward direction is the light exiting direction of the display panel 20, and the upper side of the color film layer 23 in FIG. 3 is the light entrance side of the color film layer 23, and the lower side of the color film layer 23 in FIG. 3 is the light exiting side of the color film layer 23. The grating layer 30 can be at the light exiting side of the color film layer 23, for example, the grating layer 30 can be disposed between the color film layer 23 and the second substrate 22, or the grating layer 30 can be disposed on a side of the second substrate 22 facing away from the color film layer 23. Alternatively, the grating layer 30 can be at the light entrance side of the color film layer 23, for example, the grating layer 30 can be disposed between the color film layer 23 and the first substrate 22, or the grating layer 30 can be disposed on a side of the first substrate 21 facing away from the color film layer 23.

Still referring to FIG. 3, in an embodiment of the present disclosure, the grating layer 30 is at the light exiting side of the color film layer 23 and contacts the color film layer 23. Specifically, as shown in FIG. 3, the display panel 20 comprises a first substrate 21, a second substrate 22 and a color film layer 23, the first substrate 21 and the second substrate 22 being opposite to each other and the color film layer 23 being disposed between the first substrate 21 and the second substrate 22. The grating layer 30 is disposed between the color film layer 23 and the second substrate 22, and the grating layer 30 contacts the color film layer 23. In such a design, light incident on the grating layer 30 is the light exiting from the color film layer 23, and since the grating layer 30 contacts the color film layer 23, the light exiting from the color film layer 23 will not have a light mixing before being incident on the grating layer 30, thus the effect of control of the light propagation in the display device 10 will not be reduced because of light mixing of the light exiting from the color film layer 23.

Figure 21:
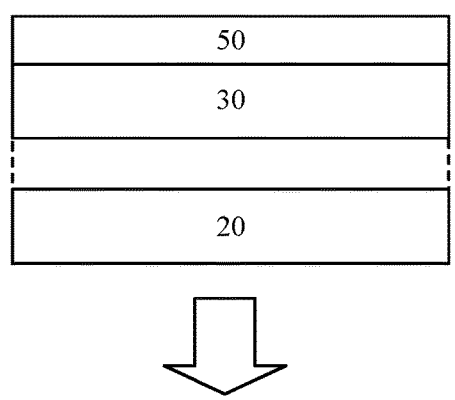
FIG. 21 schematically shows a display device according to an embodiment of the present disclosure.

In the above embodiment, the grating layer 30 can be arranged external to the display panel 20. For example, as shown in FIG. 21, the display device 10 is a liquid crystal display device, and the display device 10 comprises a back light source 50 and a display panel 20 at the light exiting side of the back light source 50. The back light source 50 provides an area light source for the display panel 20. The grating layer 30 can be arranged at the light exiting side of the back light source 50, and be in contact with the back light source 50. The area light source provided by the back light source 50 is incident on the display panel 20 after passing through the grating layer 30.

When making the display device 10 provided in the above embodiments, the grating layer 30 can be prepared by various methods, for example, the grating layer 30 can be prepared by nanoimprint process or laser interference process.

In descriptions of the above embodiments, specific features, structures, materials or characteristics can be combined in appropriate manners in any one or more embodiments or examples.

The above described are merely specific embodiments of the present disclosure, while they do not intend to limit the protection scope of the present disclosure. Any variation or substitution that is easily conceivable by those skilled in the art within the technical scope disclosed by the present disclosure shall fall into the protection scope of the present disclosure. Thus the protection scope of the present disclosure shall be defined by the appended claims.

The invention claimed is:

1. A display device, comprising: a display panel, and a grating layer arranged inside or outside of the display panel, wherein the display panel comprises a plurality of left-eye pixels of a first color, a plurality of left-eye pixels of a second color, a plurality of left-eye pixels of a third color, a plurality of right-eye pixels of the first color, a plurality of right-eye pixels of the second color, and a plurality of right-eye pixels of the third color;

the grating layer comprises a grating region of the first color, a grating region of the second color and a grating region of the third color, wherein the grating region of the first color comprises: a left-eye grating region of the first color corresponding to the left-eye pixels of the first color, and a right-eye grating region of the first color corresponding to the right-eye pixels of the first color; the grating region of the second color comprises: a left-eye grating region of the second color corresponding to the left-eye pixels of the second color, and a right-eye grating region of the second color corresponding to the right-eye pixels of the second color; the grating region of the third color comprises: a left-eye grating region of the third color corresponding to the left-eye pixels of the third color, and a right-eye grating region of the third color corresponding to the right-eye pixels of the third color;

along a direction pointing from a center of a left-eye field-of-view central area of the display device to a non left-eye field-of-view central area of the display device, a grating period of the left-eye grating region of the first color, a grating period of the left-eye grating region of the second color, and a grating period of the left-eye grating region of the third color all decrease gradually, and light emitted by the display device from a position corresponding to the left-eye pixels of the first color, light emitted by the display device from a position corresponding to the left-eye pixels of the second color, and light emitted by the display device from a position corresponding to the left-eye pixels of the third color are all directed at a left eye of a viewer;

along a direction pointing from a center of a right-eye field-of-view central area of the display device to a non right-eye field-of-view central area of the display device, a grating period of the right-eye grating region of the first color, a grating period of the right-eye grating region of the second color, and a grating period of the right-eye grating region of the third color all decrease gradually, and light emitted by the display device from a position corresponding to the right-eye pixels of the first color, light emitted by the display device from a position corresponding to the right-eye pixels of the second color, and light emitted by the display device from a position corresponding to the right-eye pixels of the third color are all directed at a right eye of the viewer; and the left-eye field-of-view central area overlaps with the right-eye field-of-view central area.

2. The display device according to claim 1, wherein along a lateral direction of the display device, from the center of the left-eye field-of-view central area to both sides of the display device, the grating period of the left-eye grating region of the first color, the grating period of the left-eye grating region of the second color, and the grating period of the left-eye grating region of the third color all decrease gradually;

along the lateral direction of the display device, from the center of the right-eye field-of-view central area to both sides of the display device, the grating period of the right-eye grating region of the first color, the grating period of the right-eye grating region of the second color, and the grating period of the right-eye grating region of the third color all decrease gradually.

3. The display device according to claim 2, wherein along a longitudinal direction of the display device, from a midpoint of a line between the center of the left-eye field-of-view central area and the center of the right-eye field-of-view central area to both sides of the display device, the grating period of the grating region of the first color, the grating period of the grating region of the second color, and the grating period of the grating region of the third color all decrease gradually.

4. The display device according to claim 1, wherein along a longitudinal direction of the display device, from the center of the left-eye field-of-view central area to both sides of the display device, the grating period of the left-eye grating region of the first color, the grating period of the left-eye grating region of the second color, and the grating period of the left-eye grating region of the third color all decrease gradually;

along the longitudinal direction of the display device, from the center of the right-eye field-of-view central area to both sides of the display device, the grating period of the right-eye grating region of the first color, the grating period of the right-eye grating region of the second color, and the grating period of the right-eye grating region of the third color all decrease gradually.

5. The display device according to claim 4, wherein along a lateral direction of the display device, from a midpoint of a line between the center of the left-eye field-of-view central area and the center of the right-eye field-of-view central area to both sides of the display device, the grating period of the grating region of the first color, the grating period of the grating region of the second color, and the grating period of the grating region of the third color all decrease gradually.

6. The display device according to claim 1, wherein along a lateral direction of the display device, from the center of the left-eye field-of-view central area to both sides of the display device, the grating period of the left-eye grating region of the first color, the grating period of the left-eye grating region of the second color, and the grating period of the left-eye grating region of the third color all decrease gradually;

along the lateral direction of the display device, from the center of the right-eye field-of-view central area to both sides of the display device, the grating period of the right-eye grating region of the first color, the grating period of the right-eye grating region of the second color, and the grating period of the right-eye grating region of the third color all decrease gradually;

along a longitudinal direction of the display device, from the center of the left-eye field-of-view central area to both sides of the display device, the grating period of the left-eye grating region of the first color, the grating period of the left-eye grating region of the second color, and the grating period of the left-eye grating region of the third color all decrease gradually;

along the longitudinal direction of the display device, from the center of the right-eye field-of-view central area to both sides of the display device, the grating period of the right-eye grating region of the first color, the grating period of the right-eye grating region of the second color, and the grating period of the right-eye grating region of the third color all decrease gradually.

7. The display device according to claim 1, wherein along a lateral direction of the display device, the display device comprises a plurality of columns of left-eye pixels of the first color, a plurality of columns of left-eye pixels of the second color, a plurality of columns of left-eye pixels of the third color, a plurality of columns of right-eye pixels of the first color, a plurality of columns of right-eye pixels of the second color, and a plurality of columns of right-eye pixels of the third color, and the columns of left-eye pixels of the first color, the columns of left-eye pixels of the second color, the columns of left-eye pixels of the third color, the columns of right-eye pixels of the first color, the columns of right-eye pixels of the second color, and the columns of right-eye pixels of the third color are arranged alternately, the columns of left-eye pixels of the first color consist of a plurality of left-eye pixels of the first color arranged along a longitudinal direction of the display device, the columns of left-eye pixels of the second color consist of a plurality of left-eye pixels of the second color arranged along the longitudinal direction of the display device, the columns of left-eye pixels of the third color consist of a plurality of left-eye pixels of the third color arranged along the longitudinal direction of the display device, the columns of right-eye pixels of the first color consist of a plurality of right-eye pixels of the first color arranged along the longitudinal direction of the display device, the columns of right-eye pixels of the second color consist of a plurality of right-eye pixels of the second color arranged along the longitudinal direction of the display device, and the columns of right-eye pixels of the third color consist of a plurality of right-eye pixels of the third color arranged along the longitudinal direction of the display device.

8. The display device according to claim 1, wherein along a longitudinal direction of the display device, the display device comprises a plurality of rows of left-eye pixels of the first color, a plurality of rows of left-eye pixels of the second color, a plurality of rows of left-eye pixels of the third color, a plurality of rows of right-eye pixels of the first color, a plurality of rows of right-eye pixels of the second color, and a plurality of rows of right-eye pixels of the third color, and the rows of left-eye pixels of the first color, the rows of left-eye pixels of the second color, the rows of left-eye pixels of the third color, the rows of right-eye pixels of the first color, the rows of right-eye pixels of the second color, and the rows of right-eye pixels of the third color are arranged alternately, the rows of left-eye pixels of the first color consist of a plurality of left-eye pixels of the first color arranged along a lateral direction of the display device, the rows of left-eye pixels of the second color consist of a plurality of left-eye pixels of the second color arranged along the lateral direction of the display device, the rows of left-eye pixels of the third color consist of a plurality of left-eye pixels of the third color arranged along the lateral direction of the display device, the rows of right-eye pixels of the first color consist of a plurality of right-eye pixels of the first color arranged along the lateral direction of the display device, the rows of right-eye pixels of the second color consist of a plurality of right-eye pixels of the second color arranged along the lateral direction of the display device, and the rows of right-eye pixels of the third color consist of a plurality of right-eye pixels of the third color arranged along the lateral direction of the display device.

9. The display device according to claim 1, wherein along a lateral direction of the display device, the left-eye pixels of the first color, the left-eye pixels of the second color, the left-eye pixels of the third color, the right-eye pixels of the first color, the right-eye pixels of the second color, and the right-eye pixels of the third color are arranged alternately;

along a longitudinal direction of the display device, the left-eye pixels of the first color, the left-eye pixels of the second color, the left-eye pixels of the third color, the right-eye pixels of the first color, the right-eye pixels of the second color, and the right-eye pixels of the third color are arranged alternately.

10. The display device according to claim 1, wherein the grating layer comprises a plurality of grating bulges, which are strip-shaped grating bulges, the grating bulges extend along a longitudinal direction of the display device and are arranged in parallel along a lateral direction of the display device.

11. The display device according to claim 1, wherein the grating layer comprises a plurality of grating bulges, which are strip-shaped grating bulges, the grating bulges extend along a lateral direction of the display device and are arranged in parallel along a longitudinal direction of the display device.

12. The display device according to claim 1, wherein the viewer views an image displayed by the display device, the image is projected on a virtual screen behind the display device, the virtual screen is a curved-surface virtual screen and has a center of a circle, and the viewer is at the center of the circle of the virtual screen.

13. The display device according to claim 1, wherein the viewer views an image displayed by the display device, the image is projected on a virtual screen behind the display device, the virtual screen is a curved-surface virtual screen and has a center of a circle, and the viewer is at a side of the center of the circle of the virtual screen close to the virtual screen.

14. The display device according to claim 1, wherein the viewer views an image displayed by the display device, the image is projected on a virtual screen behind the display device, the virtual screen is a curved-surface virtual screen and has a center of a circle, the display device is at a side of the center of the circle of the virtual screen close to the virtual screen, and the viewer is at another side of the center of the circle of the virtual screen far away from the virtual screen.

15. The display device according to claim 1, wherein the grating layer comprises a plurality of grating bulges, wherein a grating bulge corresponding to the left-eye field-of-view central area has a thickness $h_{AL}$ that satisfies the formula of:

$$h_{AL} = \frac{m_{AL}\lambda}{|n_{GAL} - n_{SAL}|}$$

wherein, $n_{GAL}$ is a refractive index of the grating bulge corresponding to the left-eye field-of-view central area, $n_{SAL}$ is a refractive index of a filler in a gap between two adjacent grating bulges corresponding to the left-eye field-of-view central area, $\lambda$ is a wavelength of incident light incident on the grating layer, $m_{AL}$ is a first constant, which satisfies: $i_{AL}-\frac{1}{2} < m_{AL} < i_{AL}+\frac{1}{2}$, $i_{AL}=1, 2, 3, 4K$;

a grating bulge corresponding to the non left-eye field-of-view central area has a thickness $h_{BL}$ that satisfies the formula of:

$$h_{BL} = \frac{m_{BL}\lambda}{|n_{GBL} - n_{SBL}|}$$

wherein, $n_{GBL}$ is a refractive index of the grating bulge corresponding to the non left-eye field-of-view central area, $n_{SBL}$ is a refractive index of a filler in a gap between two adjacent grating bulges corresponding to the non left-eye field-of-view central area, $\lambda$ is a wavelength of incident light incident on the grating layer, $m_{BL}$ is a second constant, which satisfies: $m_{BL}=i_{BL}+\frac{1}{2}$, $i_{BL}=0, 1, 2, 3, 4K$;

a grating bulge corresponding to the right-eye field-of-view central area has a thickness $h_{AR}$ that satisfies the formula of:

$$h_{AR} = \frac{m_{AR}\lambda}{|n_{GAR} - n_{SAR}|}$$

wherein, $n_{GAR}$ is a refractive index of the grating bulge corresponding to the right-eye field-of-view central area, $n_{SAR}$ is a refractive index of a filler in a gap between two adjacent grating bulges corresponding to the right-eye field-of-view central area, $\lambda$ is a wavelength of incident light incident on the grating layer, $m_{AR}$ is a third constant, which satisfies: $i_{AR}-\frac{1}{2} < m_{AR} < i_{AR}+\frac{1}{2}$, $i_{AR}=1, 2, 3, 4K$;

a grating bulge corresponding to the non right-eye field-of-view central area has a thickness $h_{BR}$ that satisfies the formula of:

$$h_{BR} = \frac{m_{BR}\lambda}{|n_{GBR} - n_{SBR}|}$$

wherein, $n_{GBR}$ is a refractive index of the grating bulge corresponding to the non right-eye field-of-view central area, $n_{SBR}$ is a refractive index of a filler in a gap between two adjacent grating bulges corresponding to the non right-eye field-of-view central area, $\lambda$ is a wavelength of incident light incident on the grating layer, $m_{BR}$ is a fourth constant, which satisfies: $m_{BL}=i_{BL}+\frac{1}{2}$, $i_{BL}=0, 1, 2, 3, 4K$.

16. The display device according to claim 15, wherein, $n_{GAL}>n_{SAL}$; $n_{GBL}>n_{SBL}$; $n_{GAR}>n_{SAR}$; $n_{GBR}>n_{SBR}$.

17. The display device according to claim 16, wherein, $n_{GAL}=n_{GBL}=n_{GAR}=n_{GBR}=1.5$, $n_{SAL}=n_{SBL}=n_{SAR}=n_{SBR}=1$.

18. The display device according to claim 15, wherein, $0.5<m_{AL}<1.5$; $m_{BL}=0.5$; $0.5<m_{AR}<1.5$; $m_{BR}=0.5$.

19. The display device according to claim 15, wherein the left-eye grating region of the first color is a left-eye R grating region, the left-eye grating region of the second color is a left-eye G grating region, the left-eye grating region of the third color is a left-eye B grating region, the right-eye grating region of the first color is a right-eye R grating region, the right-eye grating region of the second color is a right-eye G grating region, and the right-eye grating region of the third color is a right-eye B grating region, in an area corresponding to the left-eye field-of-view central area, the thickness $h_{ARL}$ of a grating bulge in the left-eye R grating region satisfies: 315 nm<$h_{ARL}$<945 nm, the thickness $h_{AGL}$ of a grating bulge in the left-eye G grating region satisfies: 275 nm<$h_{AGL}$<825 nm, the thickness $h_{ABL}$ of a grating bulge in the left-eye B grating region satisfies: 215 nm<$h_{ABL}$<645 nm;

in an area corresponding to the non left-eye field-of-view central area, the thickness $h_{BRL}$ of a grating bulge in the left-eye R grating region is 630 nm, the thickness $h_{BGL}$ of a grating bulge in the left-eye G grating region is 550 nm, the thickness $h_{BBL}$ of a grating bulge in the left-eye B grating region is 430 nm;

in an area corresponding to the right-eye field-of-view central area, the thickness $h_{ARR}$ of a grating bulge in the right-eye R grating region satisfies: 315 nm<$h_{ARR}$<945 nm, the thickness $h_{AGR}$ of a grating bulge in the right-eye G grating region satisfies: 275 nm<$h_{AGR}$<825 nm, the thickness $h_{ABR}$ of a grating bulge in the right-eye B grating region satisfies: 215 nm<$h_{ABR}$<645 nm;

in an area corresponding to the non right-eye field-of-view central area, the thickness $h_{BRR}$ of a grating bulge in the right-eye R grating region is 630 nm, the thickness $h_{BGR}$ of a grating bulge in the right-eye G grating region is 550 nm, the thickness $h_{BBR}$ of a grating bulge in the right-eye B grating region is 430 nm.

20. The display device according to claim 1, wherein in an area corresponding to the left-eye field-of-view central area, a grating duty cycle $dc_{AL}$ of the grating layer satisfies: $0.2 \leq dc_{AL} \leq 0.8$;

in an area corresponding to the non left-eye field-of-view central area, a grating duty cycle $dc_{BL}$ of the grating layer is 0.5;

in an area corresponding to the right-eye field-of-view central area, a grating duty cycle $dc_{AR}$ of the grating layer satisfies: $0.2 \leq dc_{AR} \leq 0.8$;

in an area corresponding to the non right-eye field-of-view central area, a grating duty cycle $dc_{BR}$ of the grating layer is 0.5.

* * * * *